United States Patent [19]
Morris et al.

[11] Patent Number: 5,420,974
[45] Date of Patent: May 30, 1995

[54] MULTIMEDIA COMPLEX FORM CREATION, DISPLAY AND EDITING METHOD APPARATUS

[75] Inventors: James K. Morris, Arlington; Robert E. Probst, Reston, both of Va.; Robert A. Utley, Randallstown, Md.

[73] Assignee: International Business Machines Corporation, Armonk, N.Y.

[21] Appl. No.: 961,597

[22] Filed: Oct. 15, 1992

[51] Int. Cl.$^6$ ............................................. G06F 15/60
[52] U.S. Cl. ..................................................... 395/154
[58] Field of Search ............... 395/154, 146, 148, 149, 395/152, 159; 382/61, 2

[56] References Cited

U.S. PATENT DOCUMENTS

| | | | |
|---|---|---|---|
| 5,025,396 | 6/1991 | Parks et al. | 364/518 |
| 5,038,392 | 8/1991 | Morris et al. | 382/61 |
| 5,058,185 | 10/1991 | Morris et al. | 382/41 |
| 5,119,474 | 6/1992 | Beitel et al. | 395/154 |
| 5,153,936 | 10/1992 | Morris et al. | 395/128 |
| 5,199,081 | 3/1993 | Saito et al. | 382/2 |
| 5,208,745 | 5/1993 | Quentin et al. | 364/188 |

OTHER PUBLICATIONS

Apple, "Hypercard User's Guide", 1988, pp. 147–151.
Ashton-Tate Corp., "Using Sound Notes", 1990, 4 pages.

Primary Examiner—Heather R. Herndon
Assistant Examiner—Mike Smith
Attorney, Agent, or Firm—Joseph C. Redmond, Jr.; David A. Mims, Jr.; John E. Hoel

[57] ABSTRACT

A multimedia document form system enables the definition, manipulation, storage and editing of a form which contains multimedia objects. Image objects and text objects can be displayed on the form in the conventional manner. Nonvisual presentation objects such as video objects and audio objects are represented by check boxes on the form. If a nonvisual object is to be associated with the form, then a mark is applied to the corresponding check box on the form. When the form is scanned-in in an optical scanner, presence of a mark in the check box prompts the operator to enter the nonvisual object. For example an audio object will be entered in digitized form and stored in association with the form. When the form is then displayed on a visual display device, the corresponding check box is highlighted to indicate to the operator the presence of a nonvisual presentation object which is stored in association with the form. The operator can then select the check box with a mouse, and the system will then access the stored nonvisual object and play it back for the operator.

23 Claims, 23 Drawing Sheets

FIG. 4A

FIG. 4B MODCA Format for SCANNED IN FORM_1 - EXAMPLE A1

| DIRECTORY TABLE 4 | FORM DATA | IOCA | TEXT_1 OBJ. | IMAGE_1 OBJ. | IMAGE_2 OBJ. | AUDIO_1 OBJ. |
|---|---|---|---|---|---|---|
| 42B | 44 | 46 | 50 | 52 | 54 | 56 |

40

FIG. 4C AUDIO OBJECT for FORM_1 - EXAMPLE A1

| AUDIO_1 ||||||||||||||||||||| |
|---|

FORM_1 - EXAMPLE A1 - DISPLAYED PRESENTATION

INDICIUM  F_1

TYPE NAME AND ADDRESS

JOHN DOE
123 ALPHA DRIVE
ITSDACITY, DASTATE 99999

TEXT_1

PHOTO_1

PHOTO_2

VIDEO_1

AUDIO_1

AUDIO_2

SIGNATURE_1  Θϩϭⱷψε μτΦΘϪϭ

SIGNATURE_2

ADDITIONAL TYPED COMMENTS

TEXT_2

DISPLAYED PRESENTATION OF FORM_1 - EXAMPLE A1

DIALOG FOR CHECKBOX

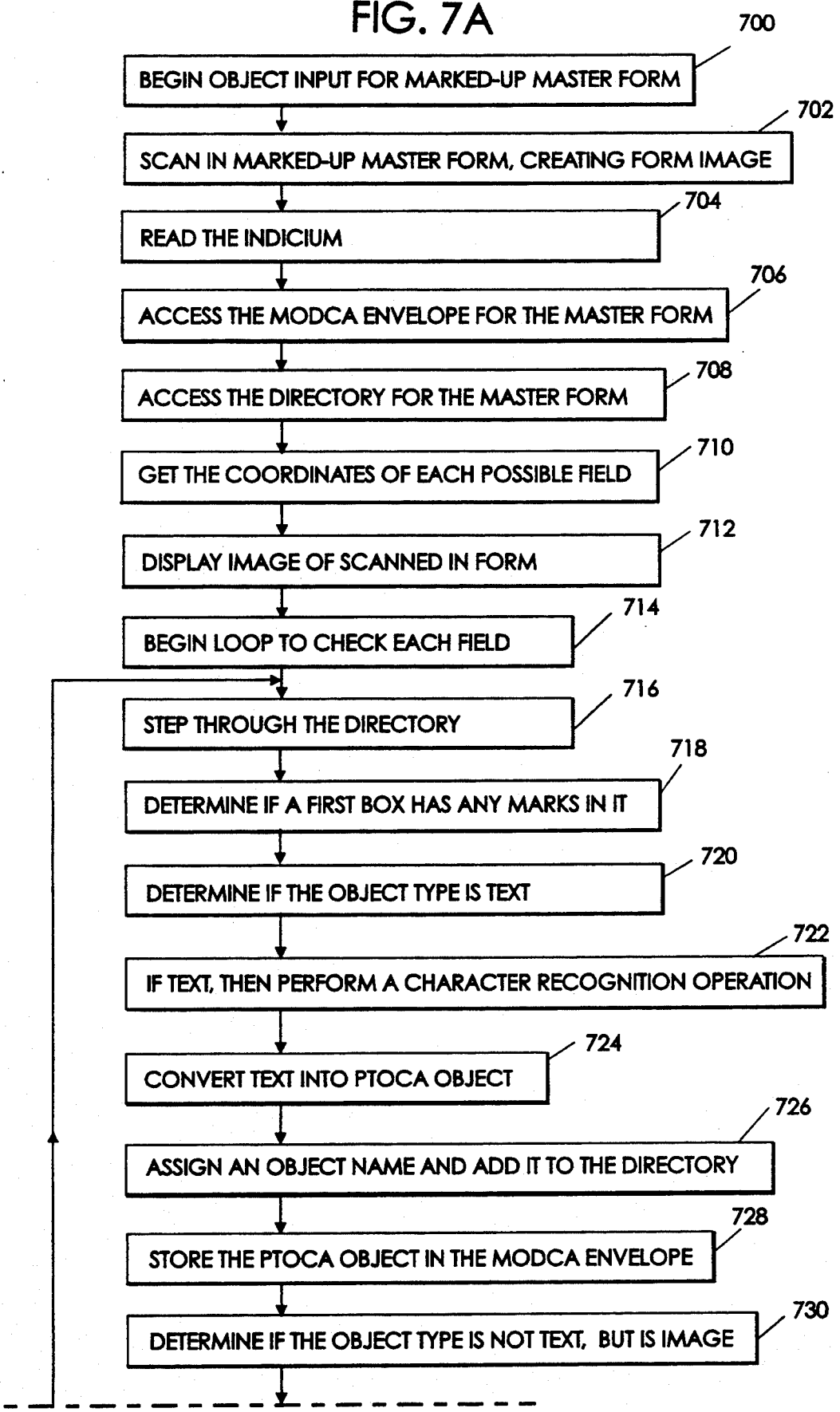

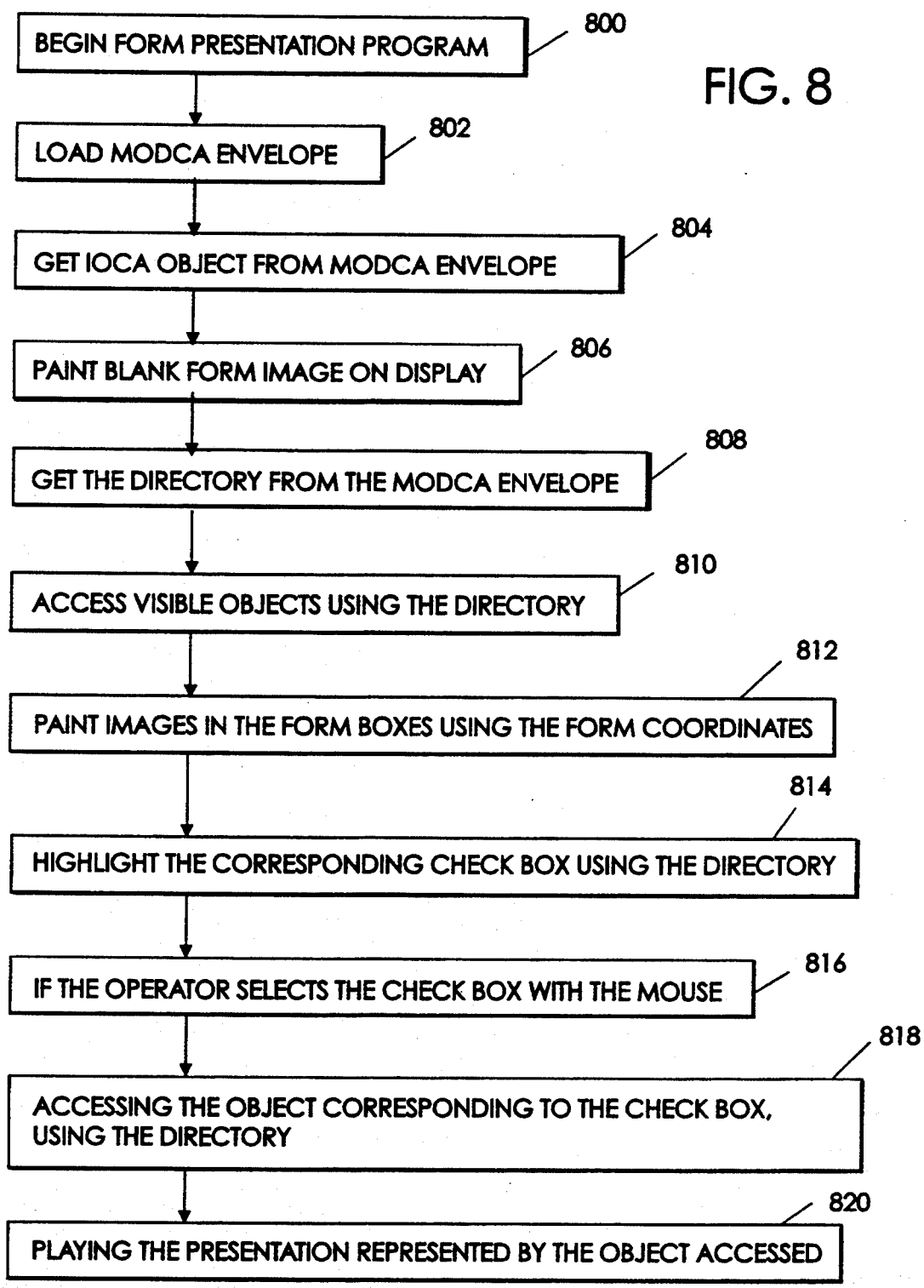

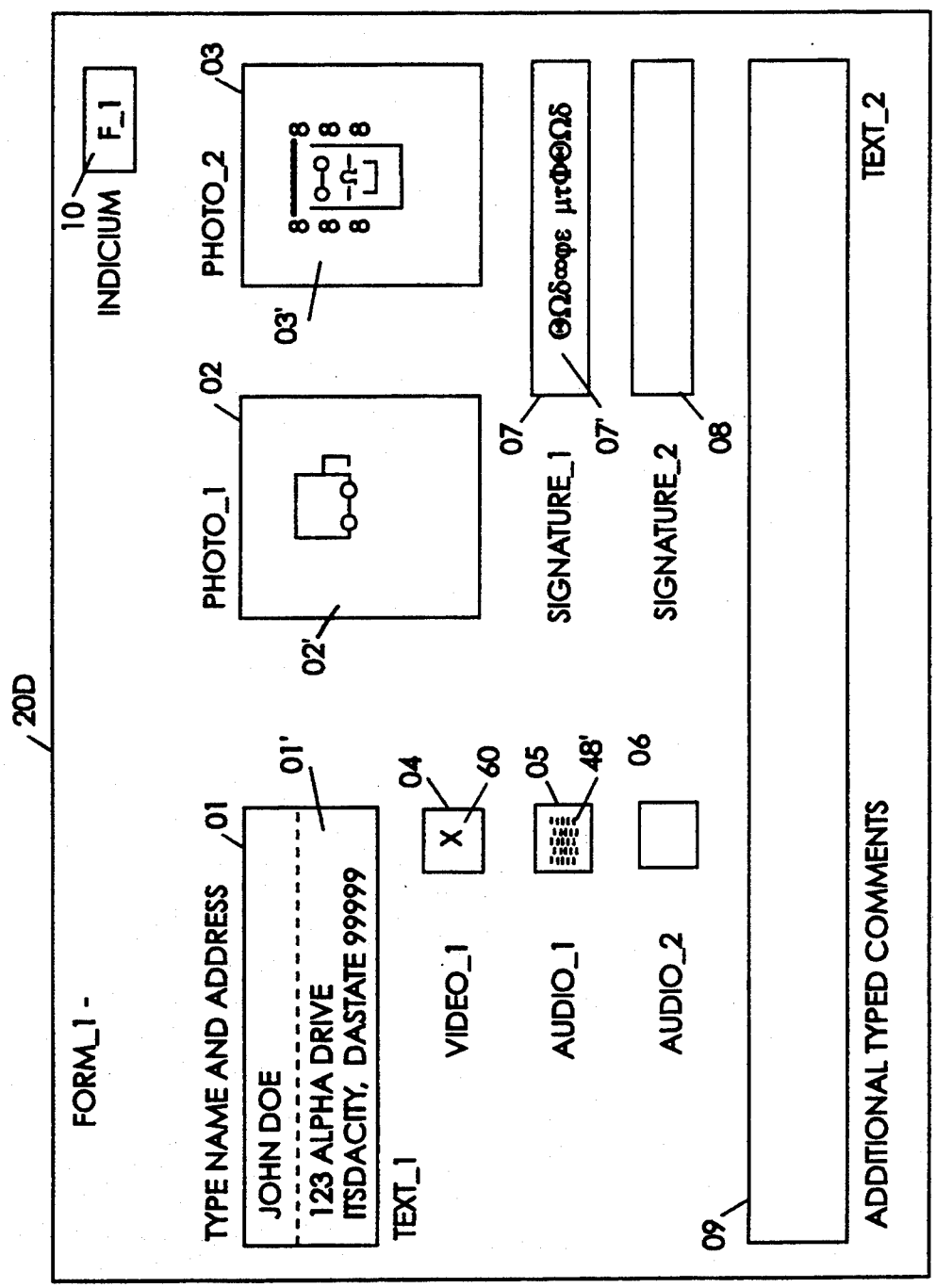

FIG. 9B

MODCA FORMAT FOR SCANNED IN AND EDITED FORM_1

| DIRECTORY TABLE 5 | FORM DATA | IOCA | TEXT_1 OBJ. | IMAGE_1 OBJ. | IMAGE_2 OBJ. | AUDIO_1 OBJ. | IMAGE_3 OBJ. | VIDEO_1 OBJ. |
|---|---|---|---|---|---|---|---|---|
| 42C | 44 | 46 | 50 | 52 | 54 | 56 | 57 | 58 |

40

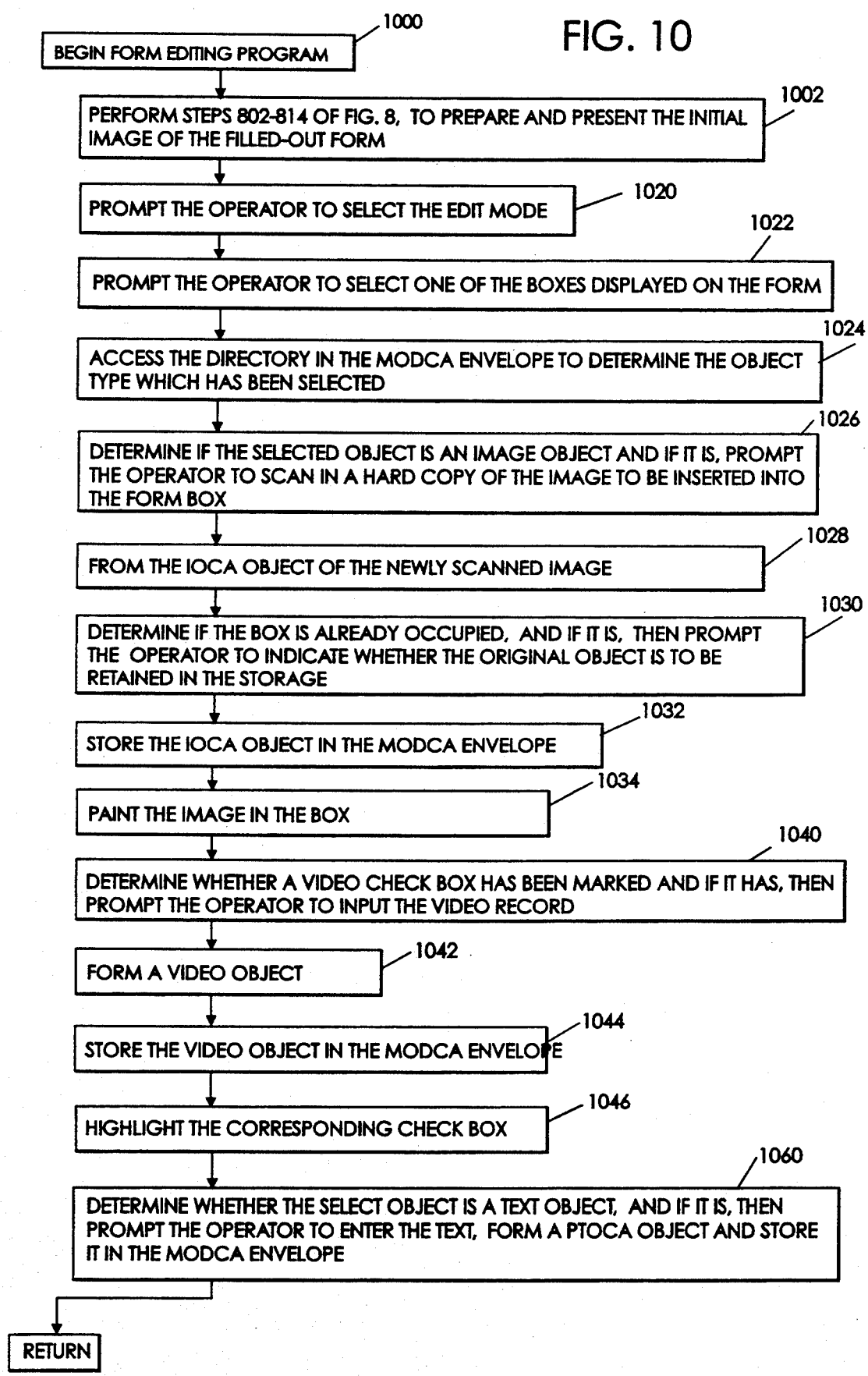

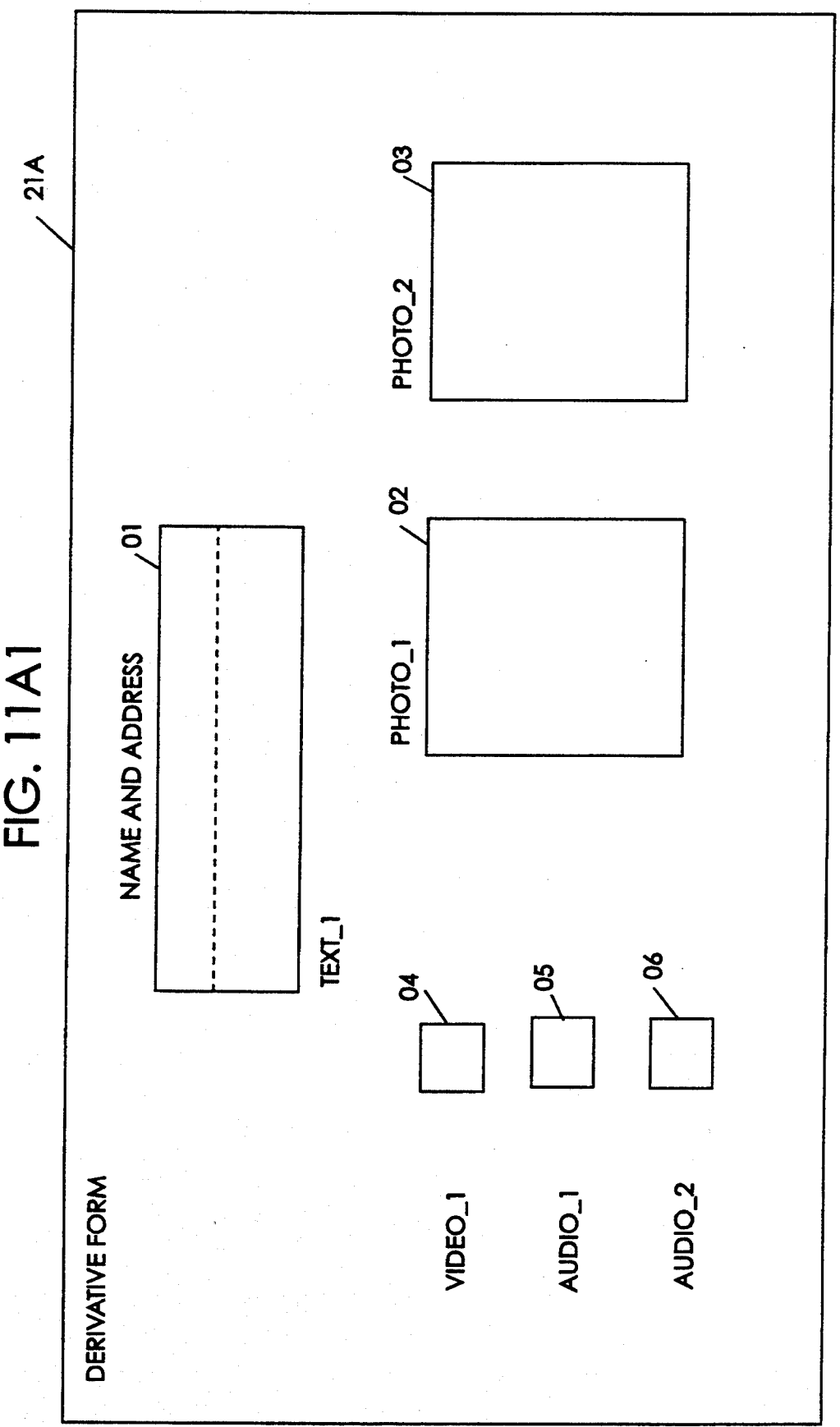

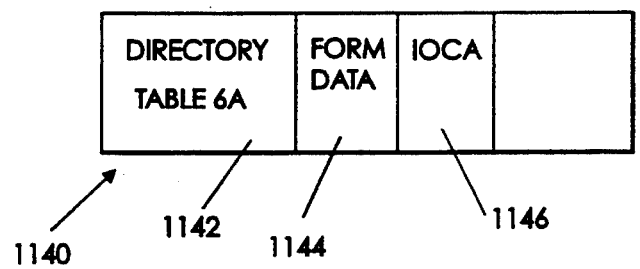
FIG. 11A2  MODCA FORMAT FOR DERIVATIVE FORM
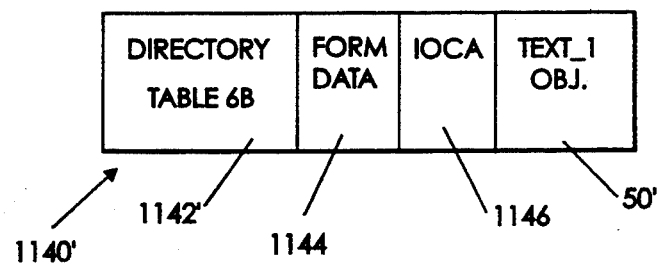
FIG. 11B2  MODCA FORMAT FOR DERIVATIVE FORM
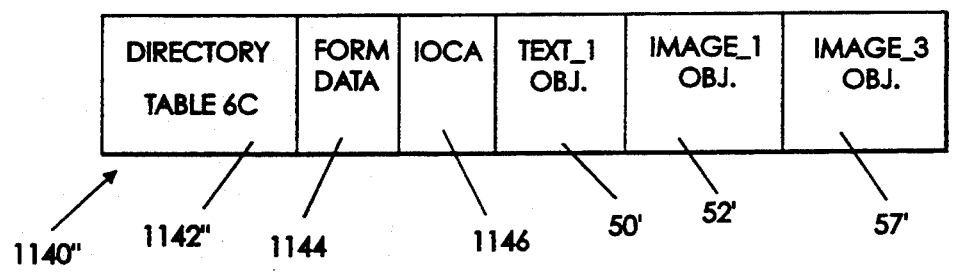
FIG. 11B2  MODCA FORMAT FOR DERIVATIVE FORM
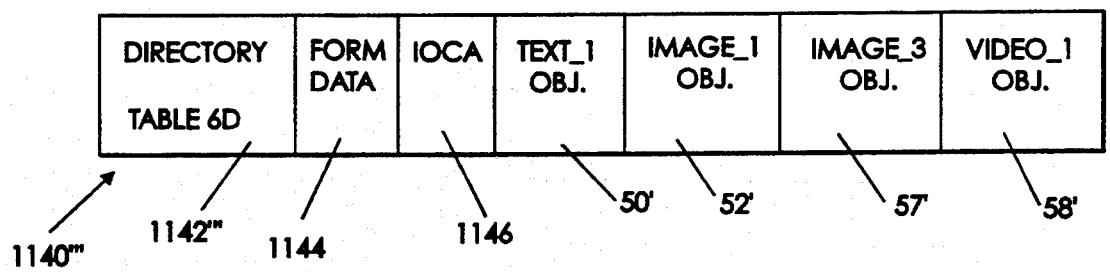
FIG. 11D2  MODCA FORMAT FOR DERIVATIVE FORM

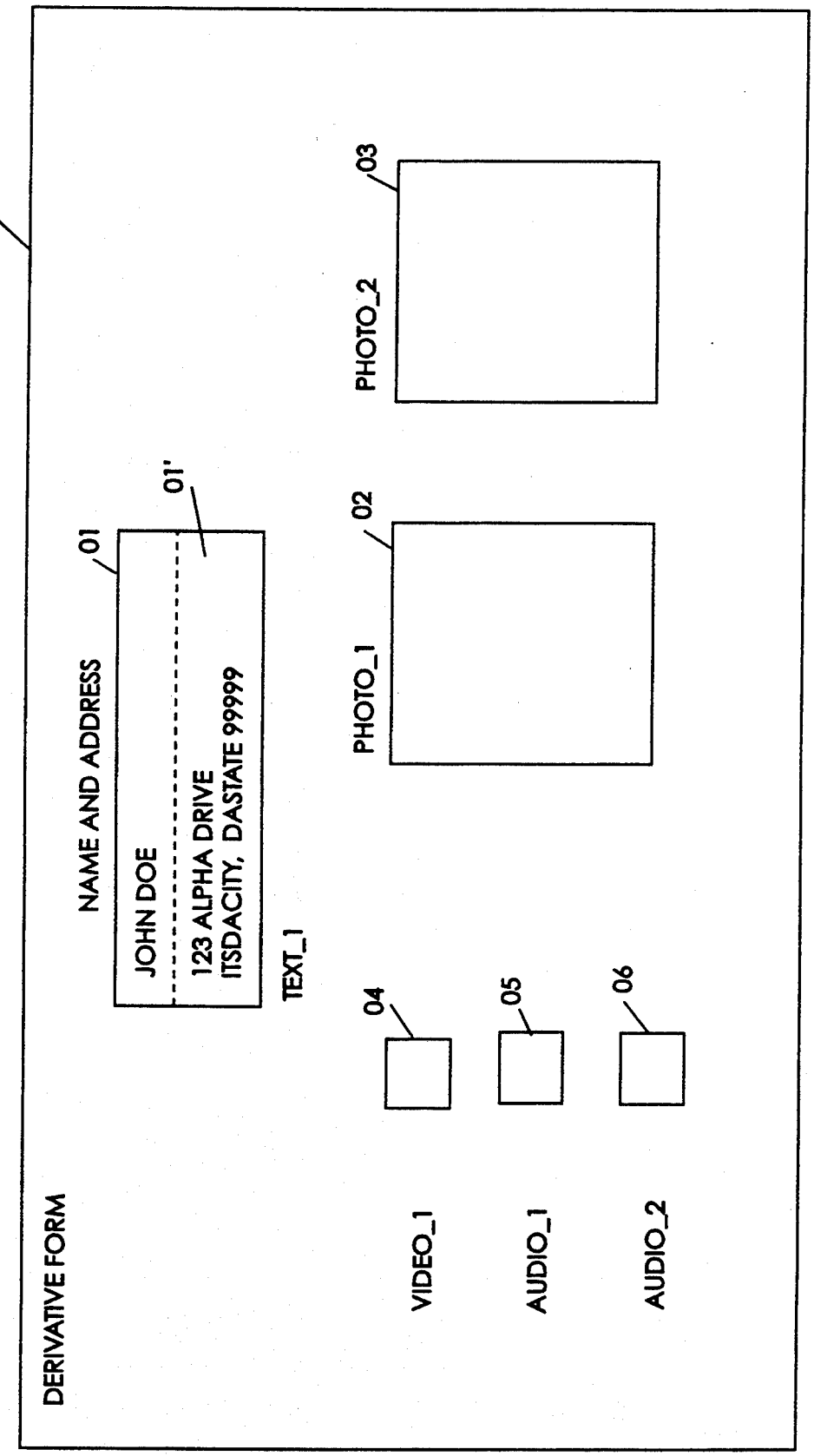
FIG. 11B1

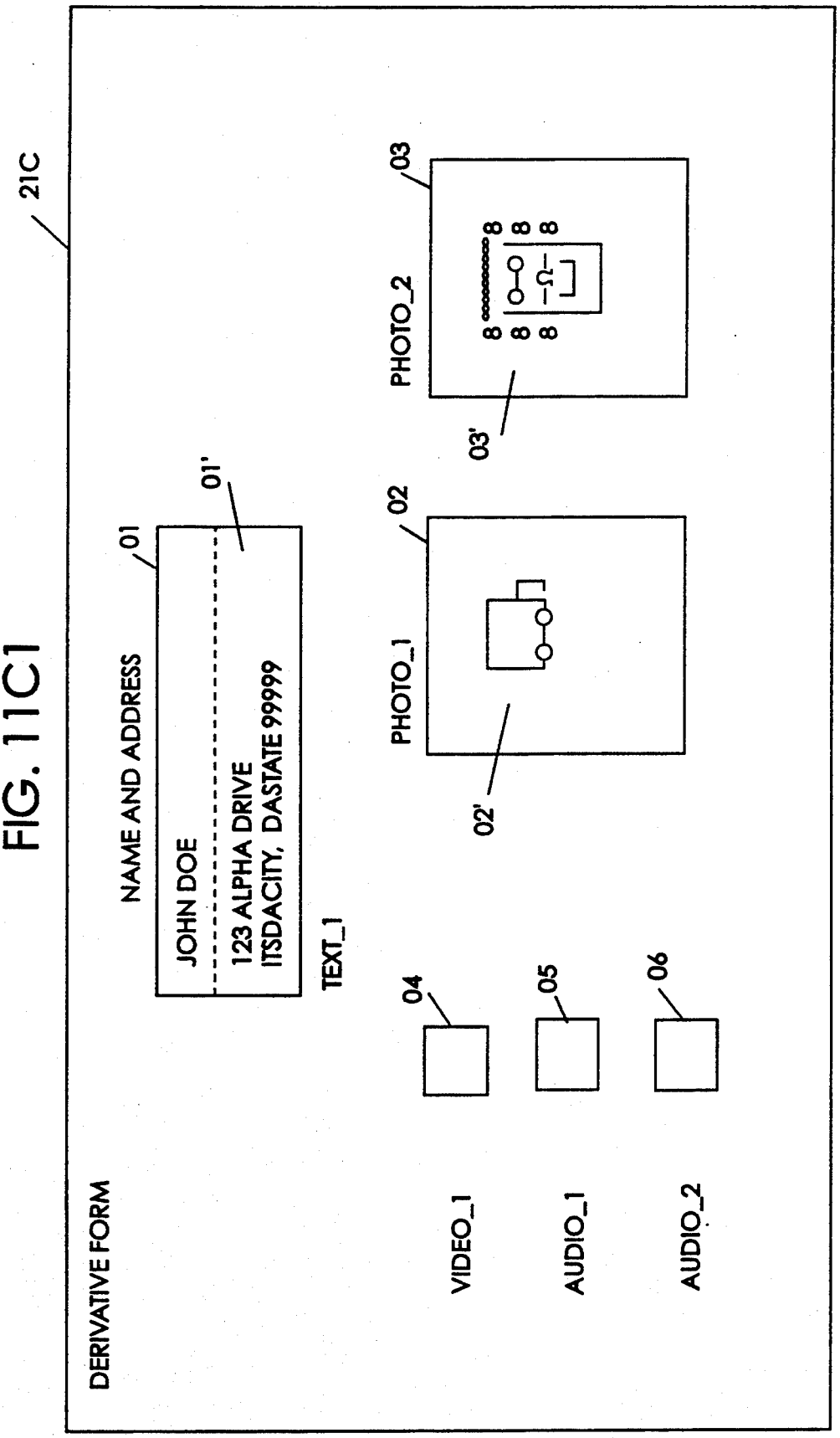
FIG. 11C1

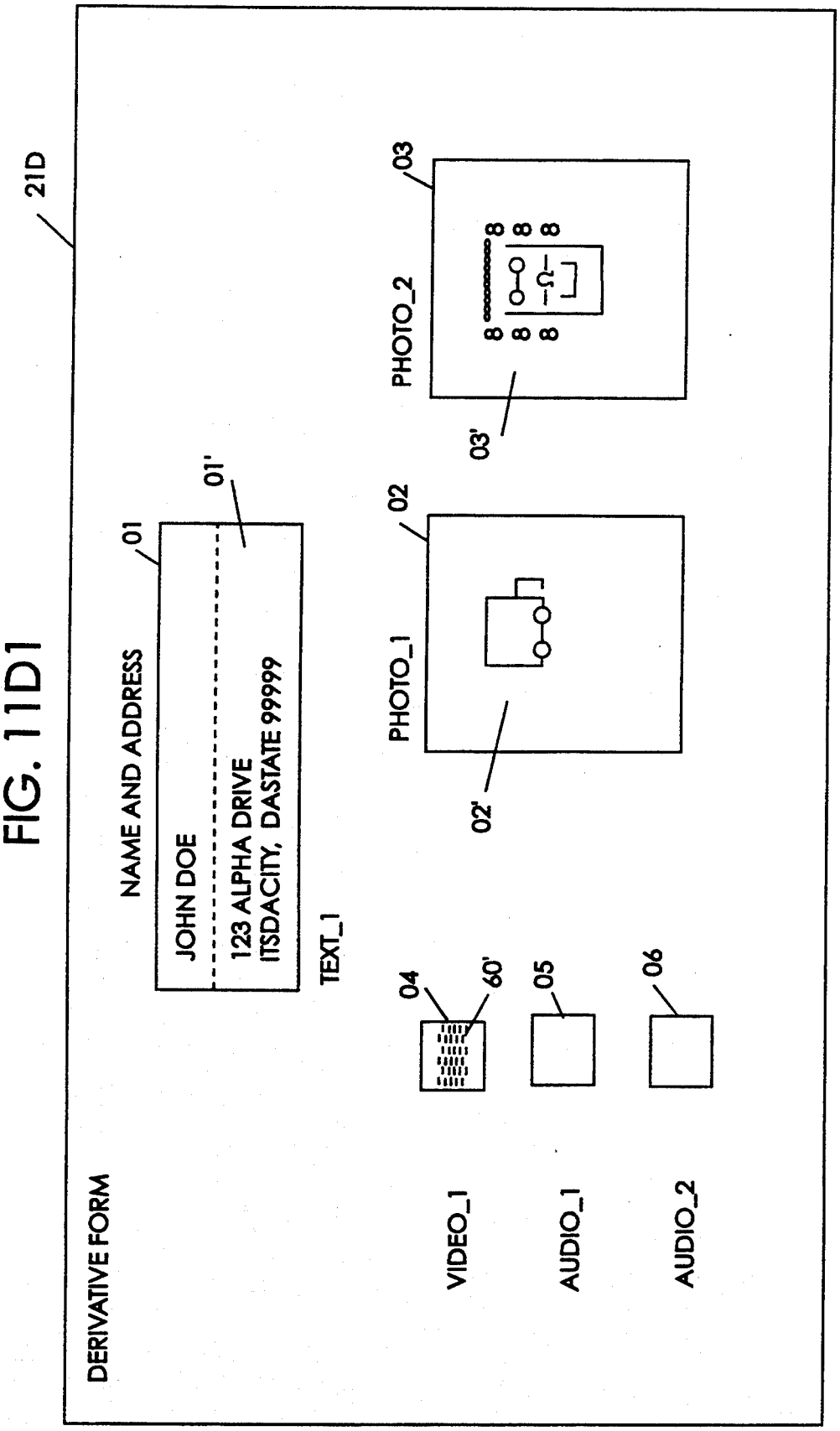

MULTIMEDIA COMPLEX FORM CREATION, DISPLAY AND EDITING METHOD APPARATUS

BACKGROUND OF THE INVENTION

1. Technical Field

The invention disclosed is broadly related to data processing systems and methods and is more particularly related to the creation, display and editing of complex, multimedia documents forms.

2. Background Art

The data processing industry has advanced to the point of making use of scanned images of document forms as an efficient means for storing, displaying and manipulating documents. A number of patents have described the general operational principles of document image architectures.

For example a system for storing and manipulating digitized images is provided in U.S. Pat. No. 5,153,936 entitled "Dual Density Digital Image System," by H. M. Morris, et al., issued Oct. 6, 1992, assigned to the IBM Corporation and incorporated herein by reference.

A patent which illustrates document image architectures is U.S. Pat. No. 5,058,185 by C. A. Parks, et al. entitled "Object Management and Delivery System Having Multiple Object-Resolution Capability," issued Oct. 15, 1991, and assigned to the IBM Corporation and incorporated herein by reference.

The above mentioned patent application and issued patent described an example digital image archiving system within which the invention herein may be applied. The data processing technique of archiving images of documents also has applied this technology to the creation and storage of blank forms of documents to be filled out later by an operator. One technique to perform text overlay onto the image of a document form is described in U.S. Pat. No. 5,025,396 by Parks, et al. entitled "Method and Apparatus for Merging a Digitized Image With an Alphanumeric Character String," assigned to the IBM Corporation and incorporated herein by reference.

An area which has not been adequately solved in the data processing industry is storage manipulation and editing of multimedia documents. Still more so, multimedia document forms have not been adequately treated in the data processing industry.

OBJECTS OF THE INVENTION

It is therefore an object of the invention to provide a means for creating, storing, manipulating and modifying multimedia document forms.

It is another object of the invention to provide an improved technique for employing image archiving systems to create, store, display and edit multimedia document forms.

SUMMARY OF THE INVENTION

These and other objects, features and advantages are accomplished by the invention disclosed herein. Part of the problem of displaying a multimedia document form is that only the visual manifestation of the multimedia object is displayable on a CRT display. In accordance with the invention, a multimedia document form is created which has two generic types of visual fields. The first generic type of visual field will display image objects, text objects and vector graphics objects.

The second generic type of visual field is a check box field and this is used primarily to indicate the presence or absence of a multimedia object which is not otherwise visually displayable. Such multimedia objects can be for example sound records, video records, sequential animation sequence records, and the like, such multimedia objects being characterized in that their presentation requires a duration of time. It is within the scope of the invention that check boxes can also be used to represent visual fields such as other image objects, other text objects, other vector graphics objects, etc.

In accordance with the invention, a multimedia form is created by either a graphics editor defining various fields on a master form or alternately by a master form being drawn out in hard copy and scanned-in to the image archiving system. The master form thus laid out is displayed on the display screen. The operator will identify various boxes depicted on the form as is check boxes or visual field boxes. If the operator designates a box as a visual field box, a directory definition begins in which the object type is defined, the object sub-type is defined, and the image coordinates are defined.

If the box being defined is a check box, then the sub-type is defined as either audio, video, image, text, or other type object. The resulting directory and the image object of the overall scanned-in form, are stored in a mixed object document content architecture envelope (MODCA).

Later, when a filled-out hard copy of the form is desired to be entered into the image archiving system, the filled-out copy of the master form is scanned-in to the system. A special indicium is associated with each master form, which uniquely identifies that form and distinguishes it from all other master forms created for the system. The system reads the indicium from the scanned-in form and then accesses the MODCA envelope the directory for the master form is then accessed to obtain the coordinates of each component field on the scanned-in form.

Then, each possible field on the scanned-in form is checked to determine if there are any marks within the field. If the directory for the master form indicates that a field box is a text object, then a character recognition operation is performed to convert the image of the characters within the field into an alphanumeric string. That alphanumeric string is then incorporated into a PTOCA (presentation text object content architecture) object and is stored in the MODCA envelope. A modification is made to the directory, assigning an object name to the PTOCA object and adding this information to the directory.

If a filled-in box is determined from the directory to be an image object, then the image is extracted and is formed into an image object content architecture (IOCA) object. Prior to this conversion, it may be necessary to scale or crop the image in order to fit within the coordinates of the box as accessed from the directory. Then, a name is assigned to the IOCA object and this information is added to the directory. The directory is then restored in the MODCA envelope along with the new IOCA object.

If the box which contains a mark in it is a check box, then the directory for the master form is accessed to determine the object type. A dialog box is presented to the operator in which the operator is requested to enter the media address for the object. Typically the object will not be a visual fields type object but instead will be an object such as a voice record, a video record, a sequential animated image object, or other multimedia object. Then, the directory in the master MODCA envelope is modified to provide an object name for the object, the object media address which has been entered by the operator. In addition, in accordance with the invention the object name is added in the directory as a pointer in the check box line of a directory to the newly added multimedia object. Then, the new object is stored. The new object may be stored as a voice object content architecture (VOCA) object in the MODCA envelope, if it is a voice record. The new object may be stored as a video object content architecture (VDOCA) record in the MODCA envelope if it is a video record. Alternately, such multimedia records may be stored externally from the MODCA envelope, such as on the hard drive in the data processing system, or on a audio tape or video tape medium. In addition, the modified directory is stored back into the MODCA envelope.

The result of having scanned-in the filled-out master form, in accordance with the invention is to create a MODCA envelope containing data representing the various component object located on the filled-out form, along with a modified directory identifying the object type, the sub-type, the coordinates, the media addresses, and pointer information relating check boxes to the actual location of the multimedia objects.

The presentation of a stored, marked-up multimedia form is also a part of the invention. Presentation of a multimedia form includes the presentation of the presence or absence of nonvisual field objects. This is accomplished, in accordance with the invention, by highlighting the respective check boxes on the visually displayed filled-out form, for those multimedia objects which have been recorded and which are associated or stored in the MODCA envelope for the filled-out form. If a check box is highlighted in a displayed, filled-out multimedia form, the operator has the option of selecting the check box, normally with a pointing device such as a mouse. When the check box is selected, the multimedia record is accessed from the MODCA envelope, for example, and is played. If it is an audio record, then the sound is played for the operator. If it is a video record, then a video cameo display window can be presented to the operator on the display screen and the video sequence played.

Further in accordance with the invention, a partially filled-out multimedia form stored in the system, in accordance with the invention, can be further modified and edited. This is accomplished by accessing the MODCA envelope for the filled-out form and displaying it on the display screen. The operator may then use a mouse to designate any of the boxes on the displayed form. Any box may be designated, whether it is currently filled in or not. Once the operator designates a box, the image type for that box is accessed from the directory. The object type for that box is accessed from the directory. If the object type is an image object, then the operator is prompted to scan in a new document containing the image which is to be inserted into the designated box on the form. An IOCA object will be created to store the data representing the bit map of the image object. The image object may be rescaled or cropped to fit within the coordinates provided by the directory. Before the IOCA object is stored in the MODCA envelope, the operator is asked whether he wishes to keep the original, in the event that the box is filled. Then the IOCA object is stored in the MODCA envelope, and the image is painted in the box of the form displayed on the display screen. If this is a new object or if it is a replacement object, the directory is updated.

If the object is a nonvisual field object, such as a voice object, then the operator is prompted to input the voice record. If the voice record is to be stored as a VOCA record in the MODCA, then the VOCA object is stored in the MODCA. The audio check box corresponding to the audio record is highlighted. A dialog box is presented to the operator in which the operator can type in the media address and optionally the object name. The directory is filled in with the object name and the object media address and in addition, the object name is added as a pointer in the check box line of the directory. The directory is then restored in the MODCA envelope along with the new multimedia object.

Additional features of the invention include the definition of a derivative presentation form from the original master form. This technique accesses the MODCA envelope for the master form and presents the operator with a dialog box where the operator will name a new derivative form. The operator will then be prompted to select various boxes from the master form displayed on the display screen. The selected boxes are then assembled in a new directory and the new directory is stored in a new derivative MODCA envelope along with the coordinates of the various boxes and the defined object types and object names.

Thus it is seen that the invention provides an improved technique for the creation, storage, manipulation and modification of multimedia document forms in a data processing system.

DESCRIPTION OF THE FIGURES

These and other objects, features and advantages will be more fully appreciated with reference to the accompanying figures.

FIG. 4A shows a partially filled-in form, in hard copy.

FIG. 4B illustrates the MODCA format for the scanned-in form of FIG. 4A.

FIG. 4C illustrates an example audio object which can be stored within the MODCA envelope of FIG. 4B.

FIG. 4D illustrates the displayed presentation of the scanned-in copy of the filled-out master form of FIG. 4A.

FIG. 8 is a flow diagram of the sequence of operational steps for the presentation of a multimedia form.

FIG. 9A illustrates the beginning appearance of a hard copy filled-out multimedia form which is to be edited.

FIG. 9B illustrates the MODCA format for the edited scanned-in form of FIG. 9A.

FIG. 10 is a flow diagram of the sequence of operational steps for editing a multimedia form.

FIGS. 11A1-11D1 and 11A2-11D2 illustrate the creation of a filled-out derivative form.

DISCUSSION OF THE PREFERRED EMBODIMENT

Figure 1:
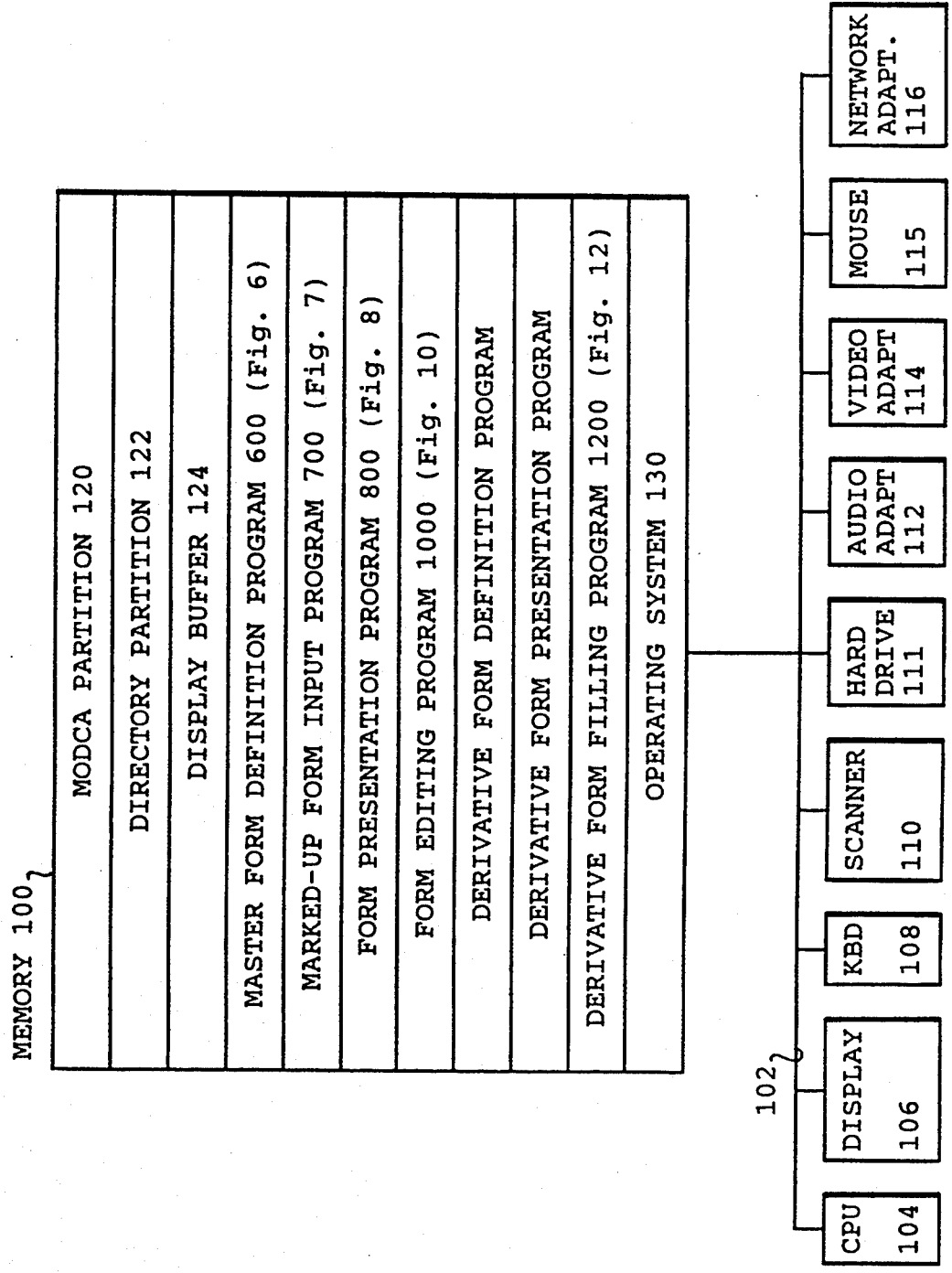
FIG. 1 is an architectural diagram of a data processing system for carrying out the invention.

FIG. 1 shows an architectural block diagram of the multimedia document form system, in accordance with the invention. The memory 100 is connected by means of the bus 102, the CPU 104, the display 106, the keyboard 108, the scanner 110, the audio adapter 112, the video adapter 114, the mouse 115, and the network adapter 116.

The memory 100 is partitioned into several portions as shown in FIG. 1. The memory 100 includes the MODCA partition 120, the directory partition 122, the display buffer 124, the master form definition program 600 shown in FIG. 6, the marked-up form input program 700 shown in FIG. 7, the form presentation program 800 shown in FIG. 8 and the form editing program 1000 shown in FIG. 10.

Figure 12A:
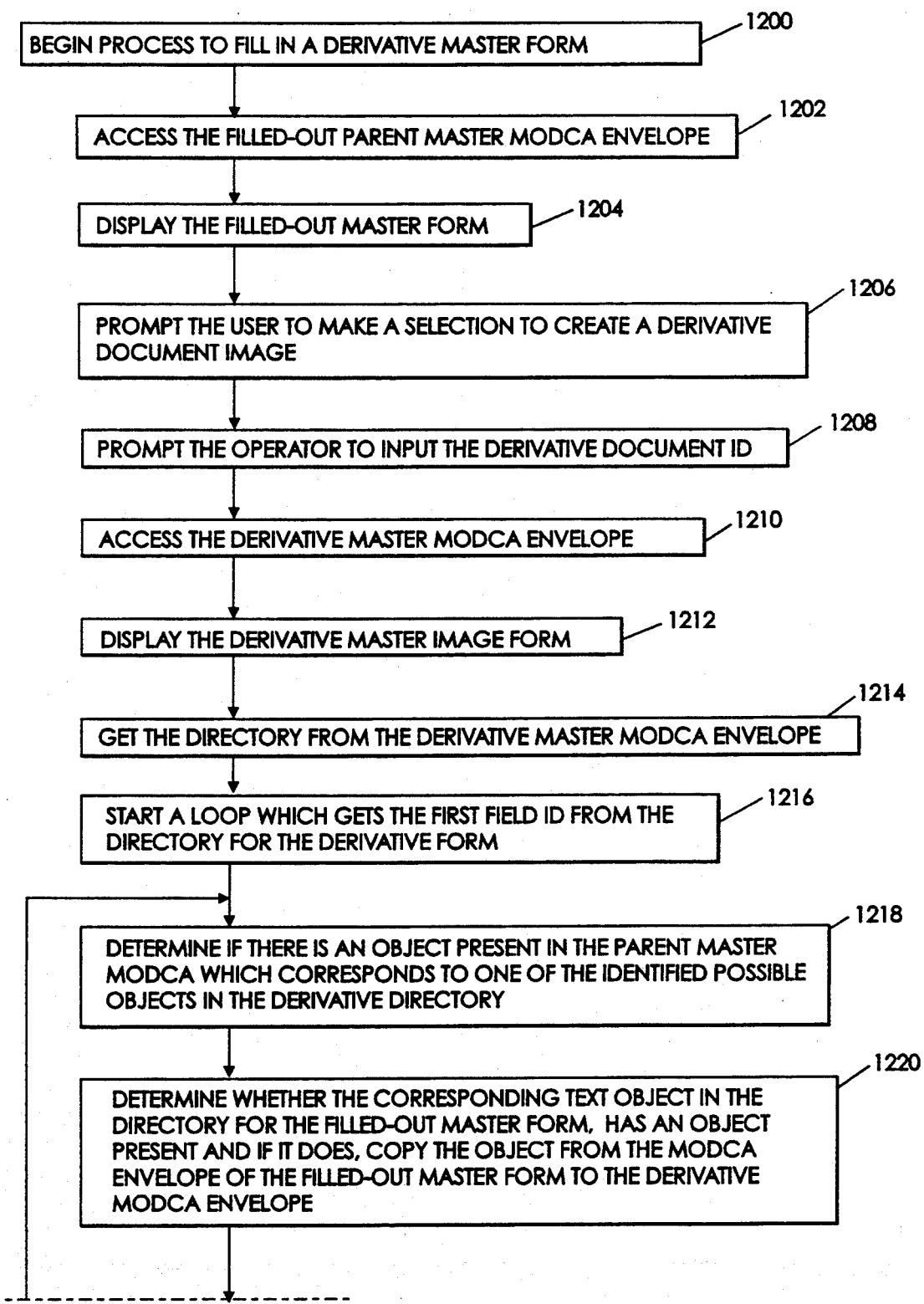
FIG. 12 is a flow diagram to create a filled-out derivative form.
Figure 12B:
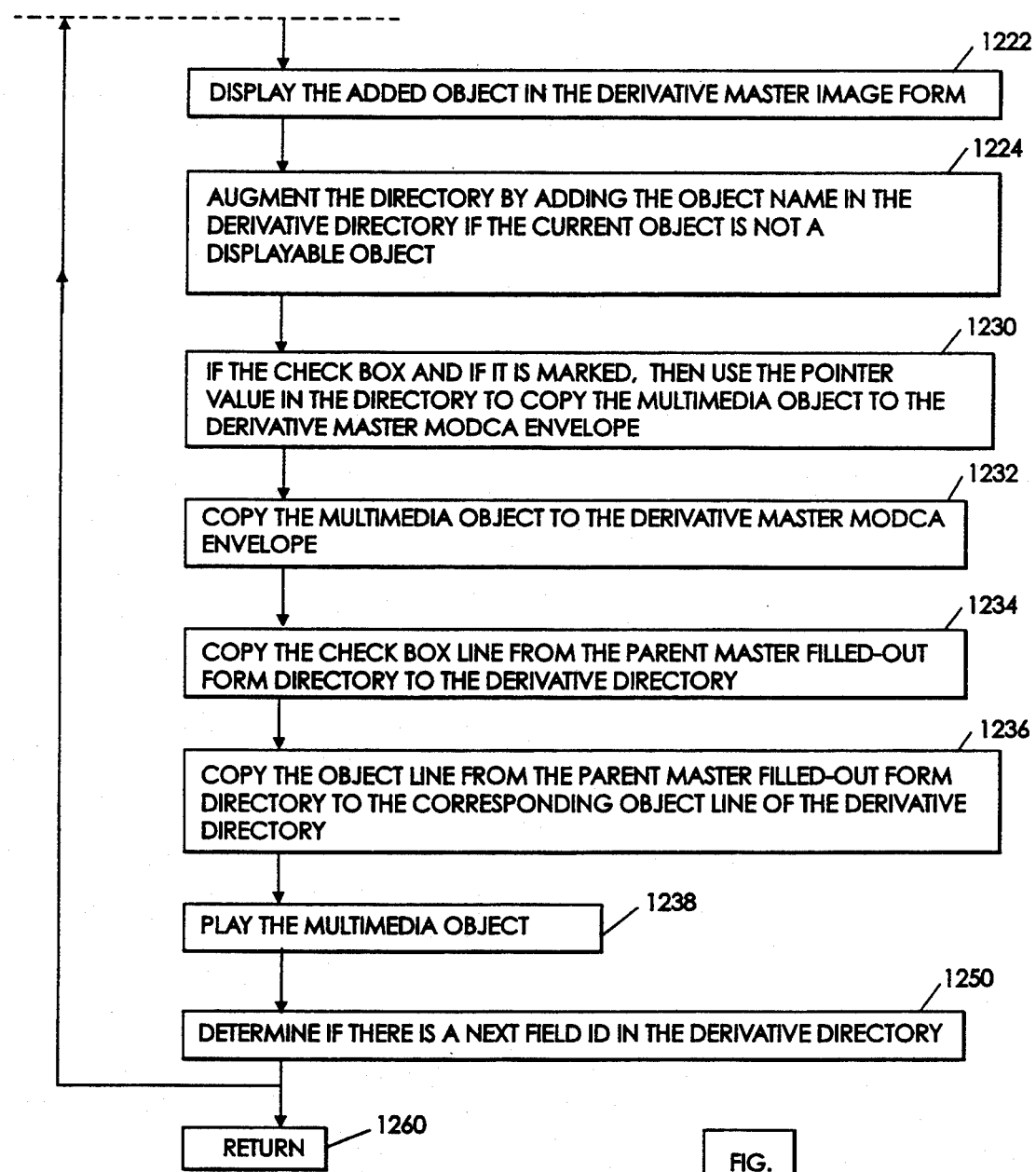
Figure 12:
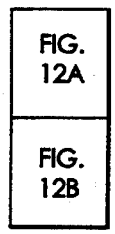

Also included in the memory 100 is a derivative form definition program, a derivative form presentation program and the derivative form filling program 1200 shown in FIG. 12. Also included in the memory 100 is the operating system 130. The programs stored in memory 100 are sequences of executable instructions which are executed by the CPU 104 in FIG. 1.

Figure 2A:
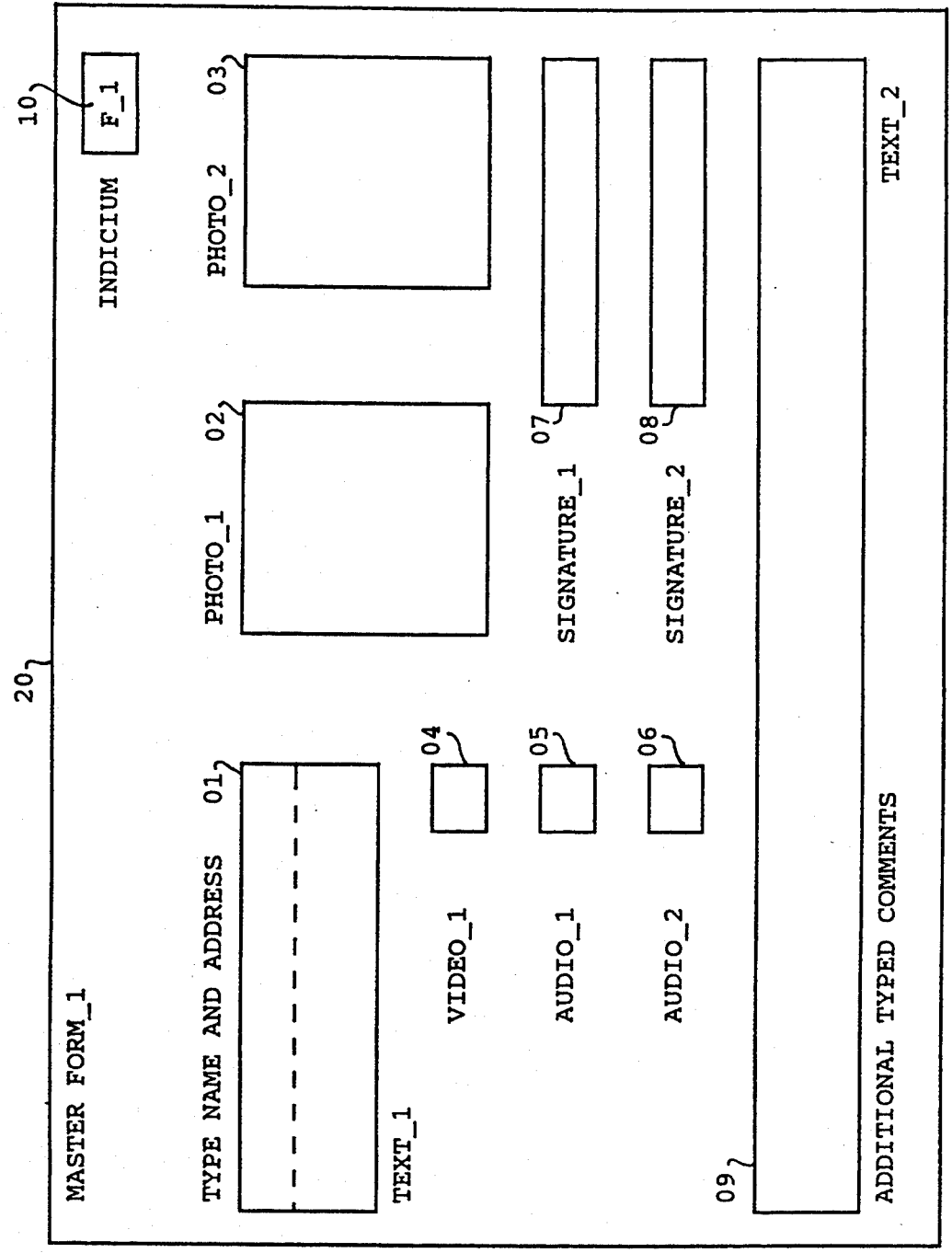
FIG. 2A illustrates a typical master form.

FIG. 2A illustrates a general class of multimedia document forms which is processed by the invention. Different types of data are stored on or in association with the form 20 shown in FIG. 2A. The master form 20 shown in FIG. 2A has an indicium 10 which identifies the form. Also included in the master form shown in FIG. 2A is a text portion 01 which would contain for example a typed name and address. An image portion 02 can contain a photograph. Another image portion 03 can contain a second photograph.

In accordance with the invention, check boxes can be included in the form 20 to identify the presence or absence of objects which are not visually presented. Nonvisual objects can include visual objects, audio objects, animation objects, and the like. Nonvisual objects are typically those objects which, when presented, require a duration of time for presentation. Check boxes 04, 05 and 06 represent video, audio and a second audio objects.

Also included in the example master form 20 of FIG. 2A, is a first signature image box 07 and a second signature image box 08. Also included in the example master form 20 of FIG. 2A, is a second text box 09 for the presentation of additional typed comments.

In accordance with the invention, if a check box, such as box 04, has a mark in it for a hard copy representation of the form, the mark is intended to indicate that there is an associated nonvisual object. Further in accordance with the invention, when an image of the master form 20 shown in FIG. 2A is displayed on a display 106 in FIG. 1, for example, if there is an associated nonvisual object for the master form 20, then the corresponding check box 04 will be highlighted, signaling the presence of the nonvisual object to the operator.

Figure 2B:
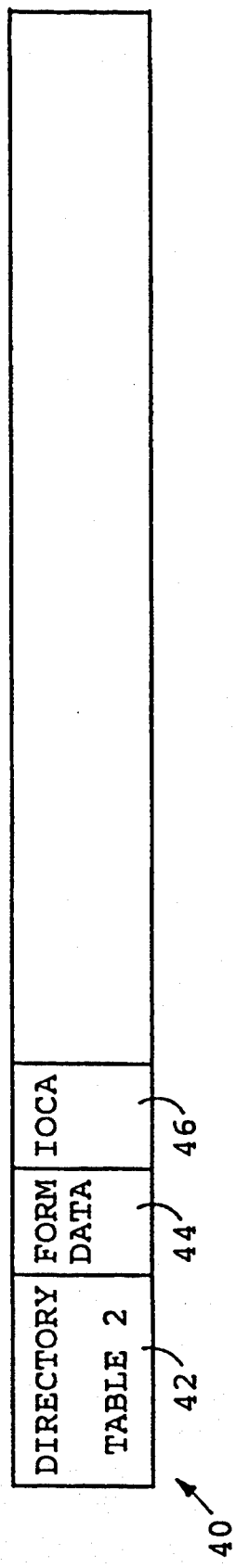
FIG. 2B illustrates the MODCA envelope which contains a directory and the IOCA object for the master form shown in FIG. 2A.

Reference can be made to FIG. 2B which shows a mixed object document content architecture (MODCA) format for the example master form of FIG. 2A. The MODCA format 40 will store a directory 42 as seen for example in Table 1. The directory in Table 1 is intended to show the wide variety of check box types and object types which can be represented by an example master form which is shown in FIG. 2A. Reference to Table 1 will show that there are at least five types of check boxes, an audio sub-type, video sub-type, image sub-type, text sub-type, and other sub-types. The nonvisual objects are audio, video, and other. Video objects can also be referred to by check boxes such as image text. Typically, the image or text objects would not be included in the MODCA format 40 of FIG. 2B, if it were necessary to use the check box to reference the object.

If the object type is not a check box, but instead is audio, video, image, text or other, then the object sub-type is data. The location of that data will be determined by the media address for nonvisual objects in the directory of Table 1. In accordance with the invention, each check box includes a pointer shown in Table 1. For example, the first entry in Table 1 is a check box with a sub-type which is audio. Included in that line is a pointer to the actual data object whose name is "AUDIO-1." There is another entry in Table 1 which is the audio data entry and it can be seen that its object name is indicated as "AUDIO-1." When the image of the check box is displayed on the display device 106 and is selected by the mouse 115 of FIG. 1, then in accordance with the invention, the directory 42 of Table 1 will use the pointer for the check box to point to the actual audio data media address. The audio data will then be accessed at the indicated media address for presentation to the operator. In the case of the presentation of audio data, it will typically be played through the audio adapter 112 of FIG. 1. In the case of video data, it will typically be played through the video adapter 114 of FIG. 1.

It can be seen in the directory 42 of Table 1, that the field coordinates are provided for each object which is shown on the master form. That is, each check box is an image of a check box which has a location specified by the coordinates in the directory 42. Each visually presented object such as image or text will have an image object type or text object type with its corresponding location coordinates given in the directory 42 of Table 1.

Reference to FIG. 2B will show that the MODCA format for the master form of FIG. 2A, includes form data 44 which generally refers to the various required information in MODCA formats. Also included in the MODCA format 40 of FIG. 2B is an image object content architecture (IOCA) object 46 for the overall image of the master form 20 shown in FIG. 2A. This will be the image of the blank form which will be painted on the screen of the display 106, prior to the painting of the component images within each box which is populated for a particular filled-in copy of the form. Table 2 is the directory 42 in FIG. 2B, if all possible objects 01 through 09, were present on or with the form.

Figure 3B:
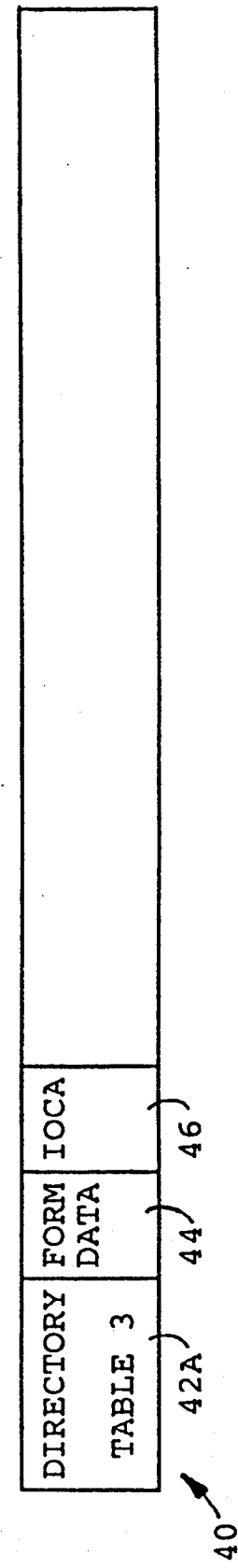
FIG. 3B shows the MODCA envelope for FIG. 3A.
Figure 3A:
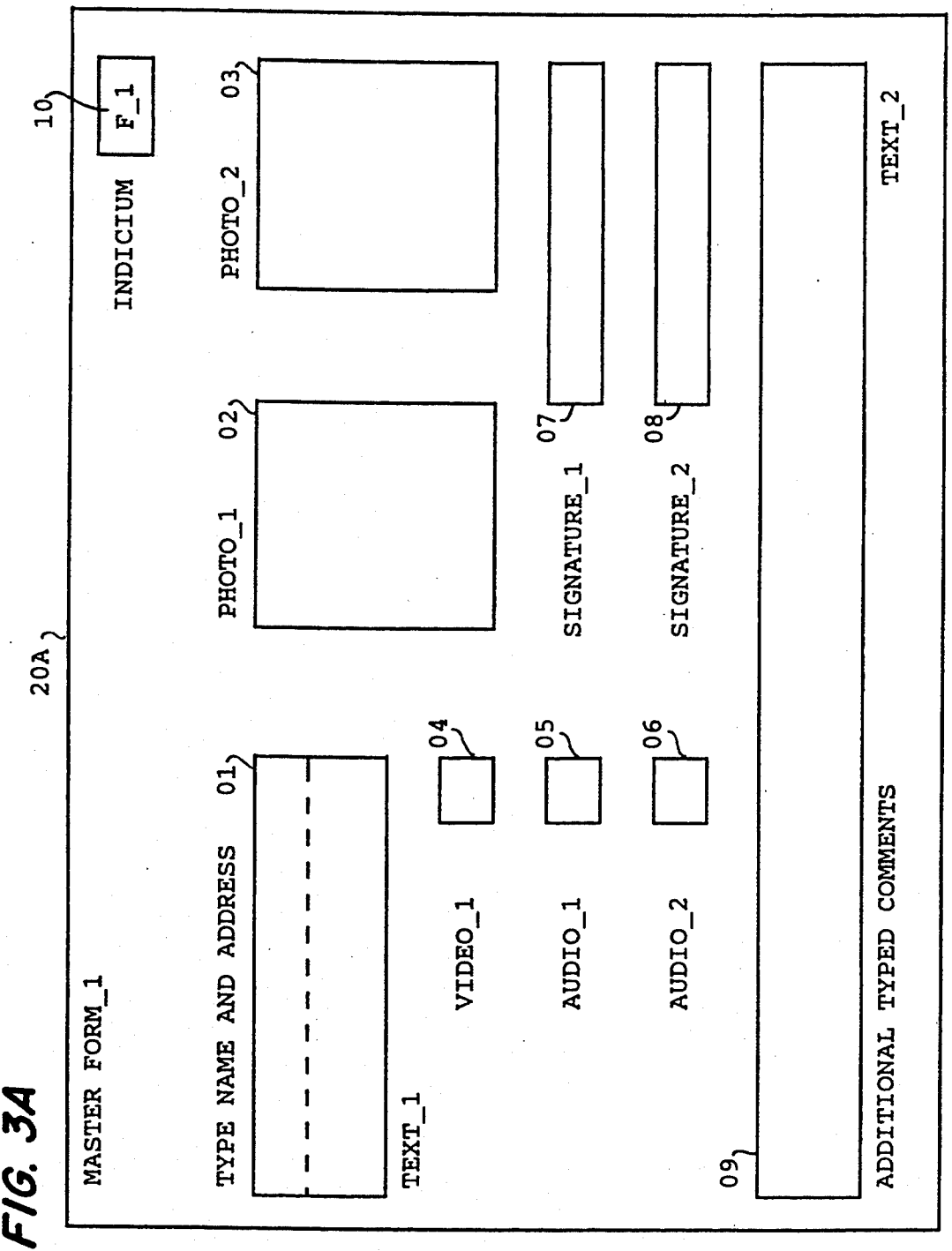
FIG. 3A shows the image of a master form.
Figure 6:
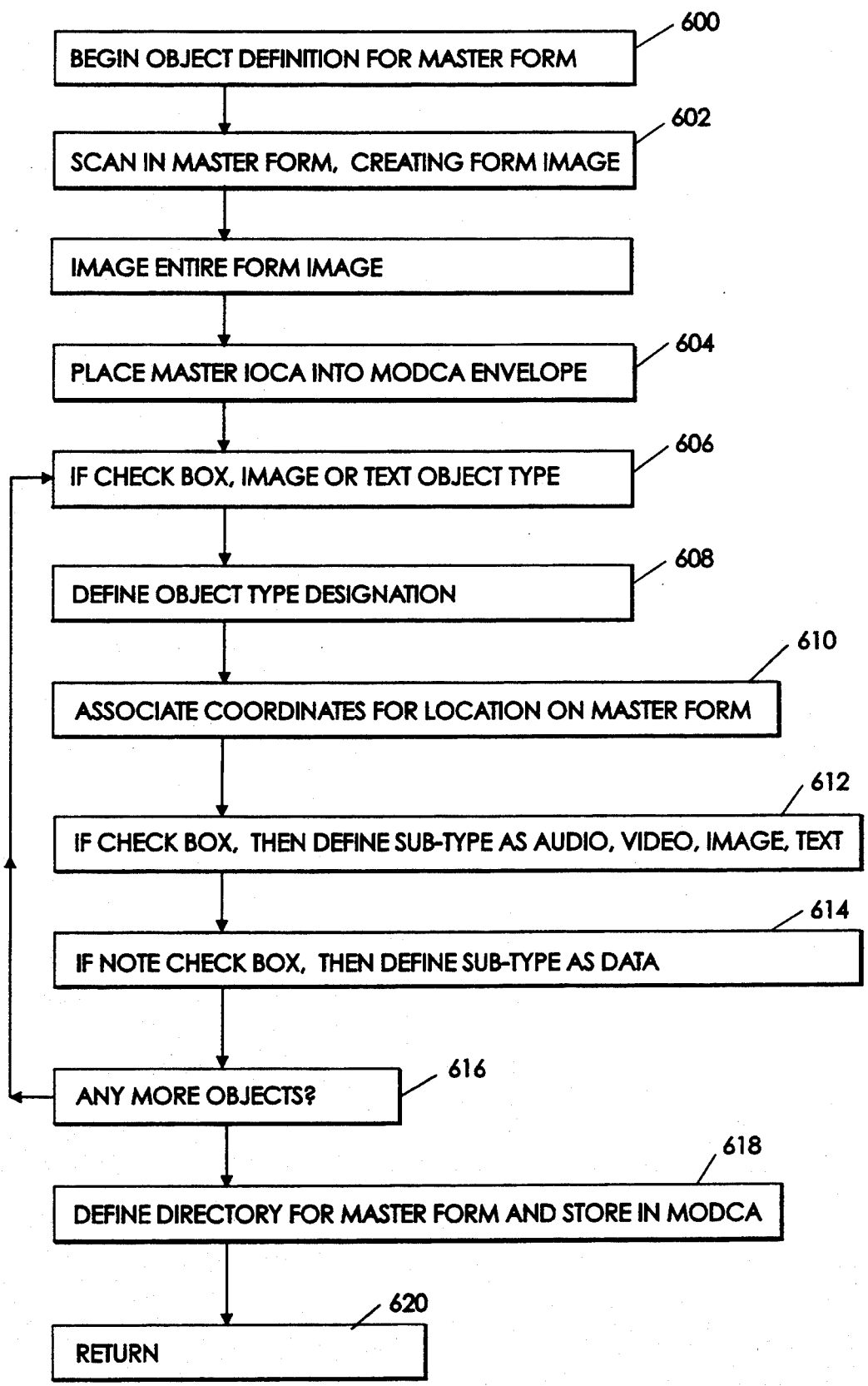
FIG. 6 is a flow diagram of the sequence of operational steps for defining the master form such as in FIG. 3A.

FIG. 3A shows the starting image for the master form 20, the starting image being referred to as 20A. FIG. 6 is a flow diagram of the sequence of operational steps for the object definition program 600 to define the master form. Step 602 provides for either scanning-in or a drawing with a graphics editor, the master form 20A. The master form 20A will include the various elements discussed in connection with the generalized master form shown in FIG. 2A. Step 604 forms an IOCA object 46 from the scanned-in image of the master form of FIG. 3A, and the IOCA object 46 is inserted into the MODCA envelope 40 of FIG. 3B. Form data 44 is also included in the MODCA envelope 40 of FIG. 3B.

Then step 606 of FIG. 6 begins the definition of the various boxes desired to be placed on the master form of FIG. 3A. Step 606 determines if a particular box indicated or drawn by the operator is to be a visually presented object, that is an image object, a text object, or a vector graphics object. Then in step 608, the object type is defined and the starting directory 42A begins to be assembled as is shown in Table 3. Next in step 610, the coordinates for the designated box are associated with the entry in the starting directory of 42A of Table 3. In the case of a check box or an image box or a text box, the coordinates are entered on the corresponding line in the directory 42A of Table 3.

Then in step 612 of FIG. 6, if a check box is to be defined, then the sub-type is defined as being an audio, video, image, text or other sub-type and this information is also entered in the corresponding line of the directory 42A of Table 3. In step 614, if the symbol to be depicted on the form is not a check box, but instead is an image, text, audio, video or other object, then the sub-type is defined as data.

Then in step 616, if there are any more component objects, the flow diagram loops back to step 606. Alternately, if there are no more component objects, then the directory 42A is defined for the master form and it is stored in the MODCA envelope 40 of FIG. 3B. The directory is represented in Table 3. Then the program returns to the main program at step 620.

Figures 7, 7B:
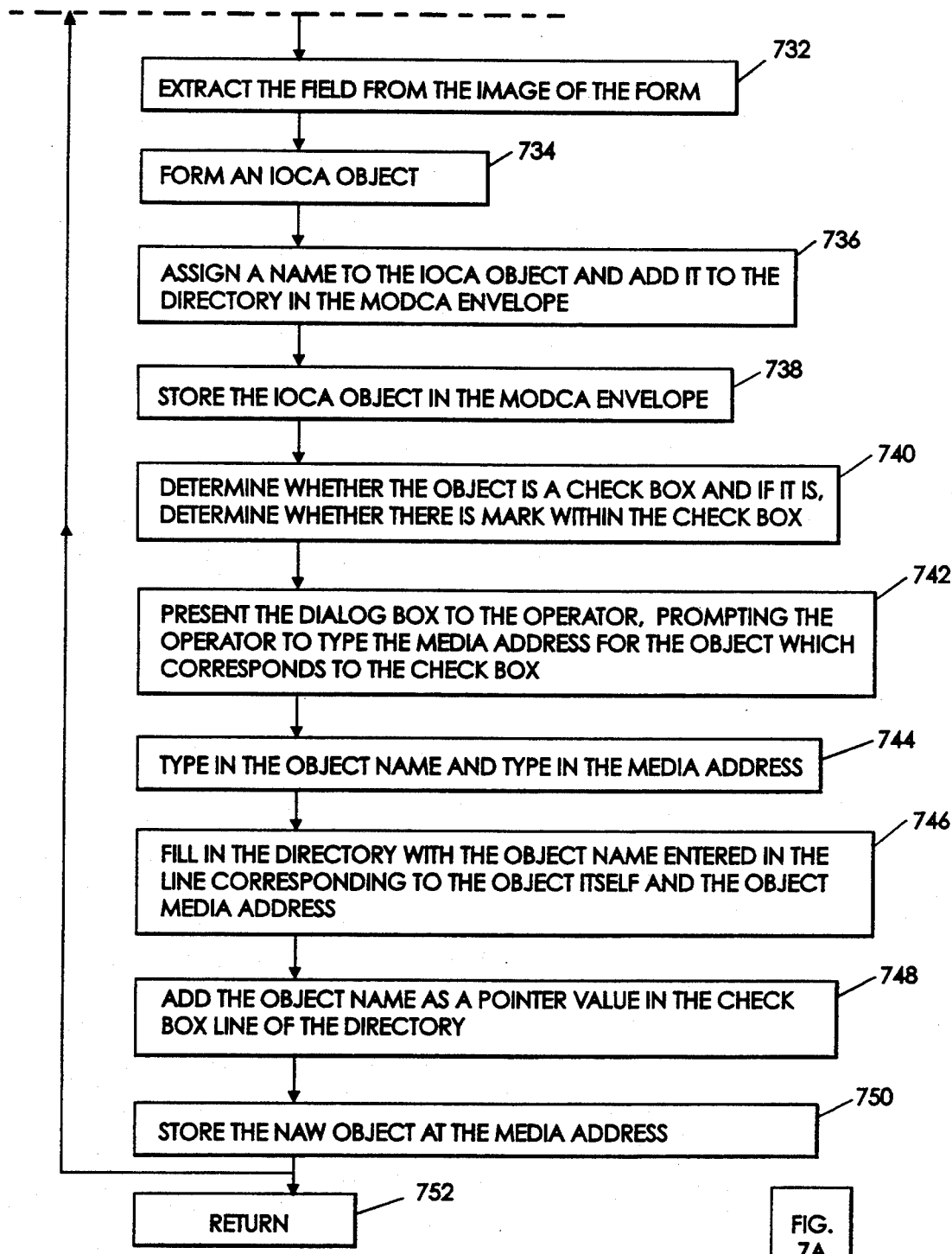
FIG. 7 is a flow diagram of a sequence of operational steps for defining the objects for a marked-up master form which has been scanned-in to the image system.

FIG. 7 shows the flow diagram of the sequence of operational steps for the marked-up form input program 700. The flow begins with step 702 which scans in the marked-up form 20B shown in FIG. 4A, creating the image of the form. Then in step 704 the indicium 10 is read. In step 706, the MODCA envelope 40 is accessed corresponding to the indicium 10 for the master form.

Figure 4A:
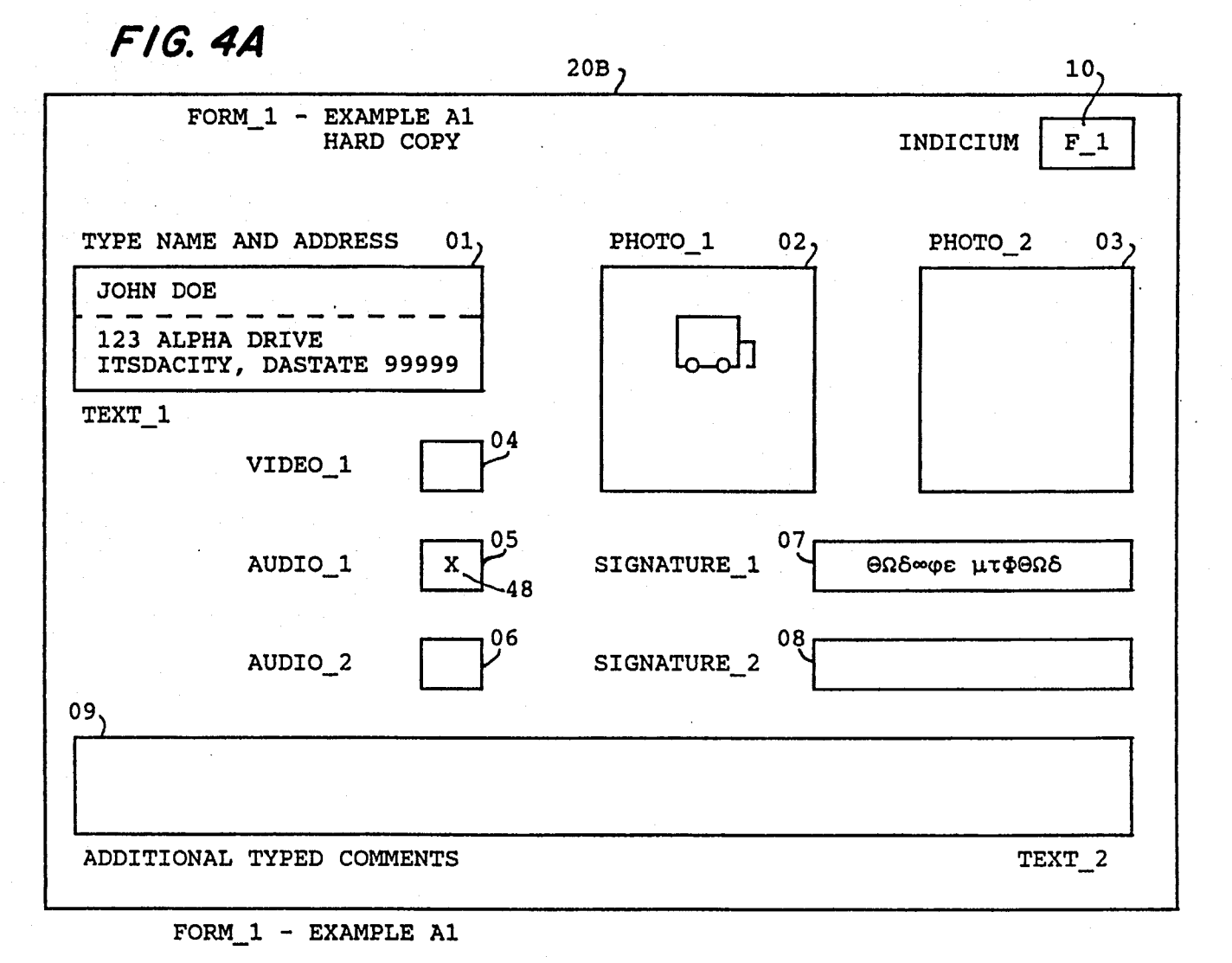

Then in step 708, the directory 42A in Table 3 is accessed from the MODCA envelope 40 of FIG. 3B. Then in step 710, the coordinates for each possible field in the marked-up form in FIG. 4A are obtained from the directory 42A. In step 712, the image of the scanned-in filled-out form of FIG. 4A can be displayed on the display 106 of FIG. 1.

Step 714 begins a loop to check each field specified in the directory 42A of Table 3, to determine if there are any visual marks in the corresponding box on the form. Step 716 steps through the directory 42A of Table 3. Step 718 determines if a first box has any marks in it. If it does not, then the next entry in the directory 42A is analyzed. However, if step 718 determines that there are marks in the corresponding box, then step 720 determines if the object type is text, as would be indicated in the directory 42A. If the object type is text, then step 722 performs a character recognition operation on the text generating an alphanumeric character string. Then step 724 converts that alphanumeric character string into a presentation text object content architecture (PTOCA) object. The PTOCA object is then assigned an object name in step 726 and that object name is added to the directory 42A of Table 3, resulting in the beginning of the customization of the directory into that shown in Table 4. The directory in Table 4 is referenced as 42B. Then in step 728, the PTOCA object 50 is stored in the MODCA envelope 40, as is shown in FIG. 4B. The updated directory 42B is also rewritten into the envelope 40 of FIG. 4B.

In the flow diagram of FIG. 7, if step 720 determined that the object type was not text, then step 730 determines if the object type is an image, as would be indicated from the Table 4 for the directory 42B. If the object type is an image, then step 732 extracts the field from the image of the overall form in FIG. 4A. The extracted image is then formed into an IOCA object in step 734. Step 736 then assigns a name to the IOCA object and the name is added to the directory 42B in Table 4. Then in step 738, the IOCA object is stored as object 52 in the MODCA envelope 40 of FIG. 4B. The updated directory 42B is also stored in the envelope 40.

If step 730 determined that the object is not an image object, then step 740 determines whether the object type is a check box. For example the check box 05 in the filled-out form of FIG. 4A has an X mark 48 in it. If step 740 determines that the box for the directory line is a check box, and it also determines that there is a mark within the check box, then step 742 presents the dialog box 745 of FIG. 5 for the operator, at the display 106. The dialog box of FIG. 5 states the object type and in step 744 it prompts the operator to type in the media address for the object which corresponds to the check box. Optionally, the dialog box of FIG. 5 can also prompt the operator to type in an object name. Alternately, the object name can be a sequentially indexed value which assigned as the object name for the object corresponding to the check box.

Then in step 746, the directory 42B of Table 4 is filled in so that the object name and the media address are entered in the line corresponding to the object itself. For example, since box 05 is an audio check box, the audio data line in directory 42B of Table 4, has the name of the audio object "AUDIO-1" entered as the object name and "MODCA-VOCA" as the media address in the directory.

In addition, the object name "AUDIO-1" is entered as a pointer value on the line for the audio check box, as is seen in directory 42B of Table 4. The function of the pointer value is to relate the check box depicted on the form to the nonvisual object such as the audio object "AUDIO-1."

Figure 5:
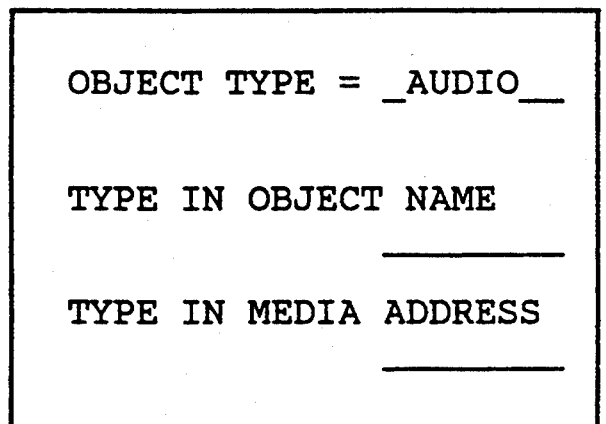
FIG. 5 shows the dialog box for entry of data about the check box which has been marked in FIG. 4A.

Step 748 adds the object name as the pointer in the check box line of the directory. Then 750 stores the new object at the media address. In this example, the media address entered by the operator in the dialog box of FIG. 5, is a voice object content architecture (VOCA) media address, indicating that the VOCA object 56 is to be stored in the MODCA envelope 40 of FIG. 4B.

Alternately, instead of storing the audio object in the MODCA envelope 40, it can be stored separately as a digitized file on the hard drive of the system of FIG. 1, the hard drive 111, or alternately it can be stored in a separate storage medium such as in a audio tape or on a CD ROM which is separately mounted and played. In such case, the operator will be prompted to prepare the storage device containing the audio file for playback. Then step 752 returns to the main program.

FIG. 8 describes the form presentation program 800. The flow begins with step 802 which loads the MODCA envelope 40 of FIG. 4B which represents the image of the filled-in form of FIG. 4A. Then in step 804, the IOCA object 46 is accessed from the MODCA envelope 40 of FIG. 4B, to paint the blank form image of FIG. 3A onto the display device 106. Step 806 paints the blank form image of FIG. 3A for the form 20A onto the display device.

Then step 808 gets the directory 42B, shown in Table 4, from the MODCA envelope 40. Then step 810 of FIG. 8 accesses the visible objects 01 which is a text object, 05 which is a check box and 07 which is an image box using the directory 42B. Then in step 812, the images of the text object 50 for the text box 01, the image object 52 for the text box 02 and the image object 54 for the signature box 07 are painted into their respective boxes of the blank form displayed on the display device 106, resulting in the displayed image shown in FIG. 4D. It can be seen that the text is presented as 01', the image is presented as 02' and the signature is presented as 07' in FIG. 4D.

Then, in accordance with the invention, step 814 of FIG. 8 highlights with a highlighting 48' the interior of the check box 05 for the audio check box. This is done using the information from the directory 42B which indicates that the audio check box 05 has a pointer value in the pointer column. The displayed appearance of the check box 05 is highlighted in response to this information in the directory 42B.

Then, in accordance with the invention, if the operator chooses to select the check box 05 with the mouse pointing device 115, then step 818 accesses the audio object "AUDIO-1" by using the pointer value in the check box entry of the directory 42B of Table 4, to enter the audio data line in the directory 42B of Table 4, to identify the immediate address for the audio data. In this example, the media address is the VOCA address for the audio object 56 which is located in the MODCA envelope 40 shown in FIG. 4B. Then step 812 will play the audio object, generating the acoustical energy through the audio adapter 112 of FIG. 1.

FIG. 10 shows the flow diagram of the sequence of operational steps for the form editing program 1000. The form editing program 1000 begins with section 1002 which repeats steps 802–814 of FIG. 8, to prepare and present the initial image of the filled-out form which is desired to be edited, as is shown in FIG. 4D. Then step 1020 of FIG. 10 prompts the operator to select the edit mode, this can be done by depressing a function key. Then step 1022 prompts the operator to select one of the boxes 01–09 shown in the displayed form of FIG. 4D, by using the mouse pointing device 115. Then step 1024 accesses the directory 42B which is Table 4, in the MODCA envelope 40 of FIG. 4B, to determine what type of object has been selected.

Then step 1026 determines if the selected object is an image object. In this example, the operator has selected the image box 03 shown in FIG. 9A. Then step 1026 prompts the operator to scan in a hard copy form of the image which is desired to be inserted into the form box 03. Step 1028 forms the IOCA object 57 for the newly scanned image. The image can be sized or cropped to fit into the box 03. Then step 1030 determines if the box is already occupied from the directory (Table 4) and if it is, then the operator is prompted to indicate whether the original is to be retained in storage or destroyed.

Step 1032 stores the IOCA object 57 in the MODCA envelope 40 and adds the object name "IMAGE-3" to the directory 42C (Table 5). Step 1034 paints the image 03' in the box 03, as is shown in FIG. 9A. Step 1040 determines whether a video check box has been marked. In the example shown in FIG. 9A, the video check box 04 has been marked with the mark X which is reference 60. Step 1040 then prompts the operator to input the video record. Step 1042 forms a video object content architecture (VDOCA) object 58. Step 1044 stores the object 58 in the MODCA envelope 40, as is shown in FIG. 9B and adds the object name "VIDEO-1" as the pointer in the check box 04 line of the directory 42C (Table 5). It then adds the object name "VIDEO-1" and the media address "MODCA-VOCA" in the video data line of the directory 42C (Table 5).

Figure 9C:
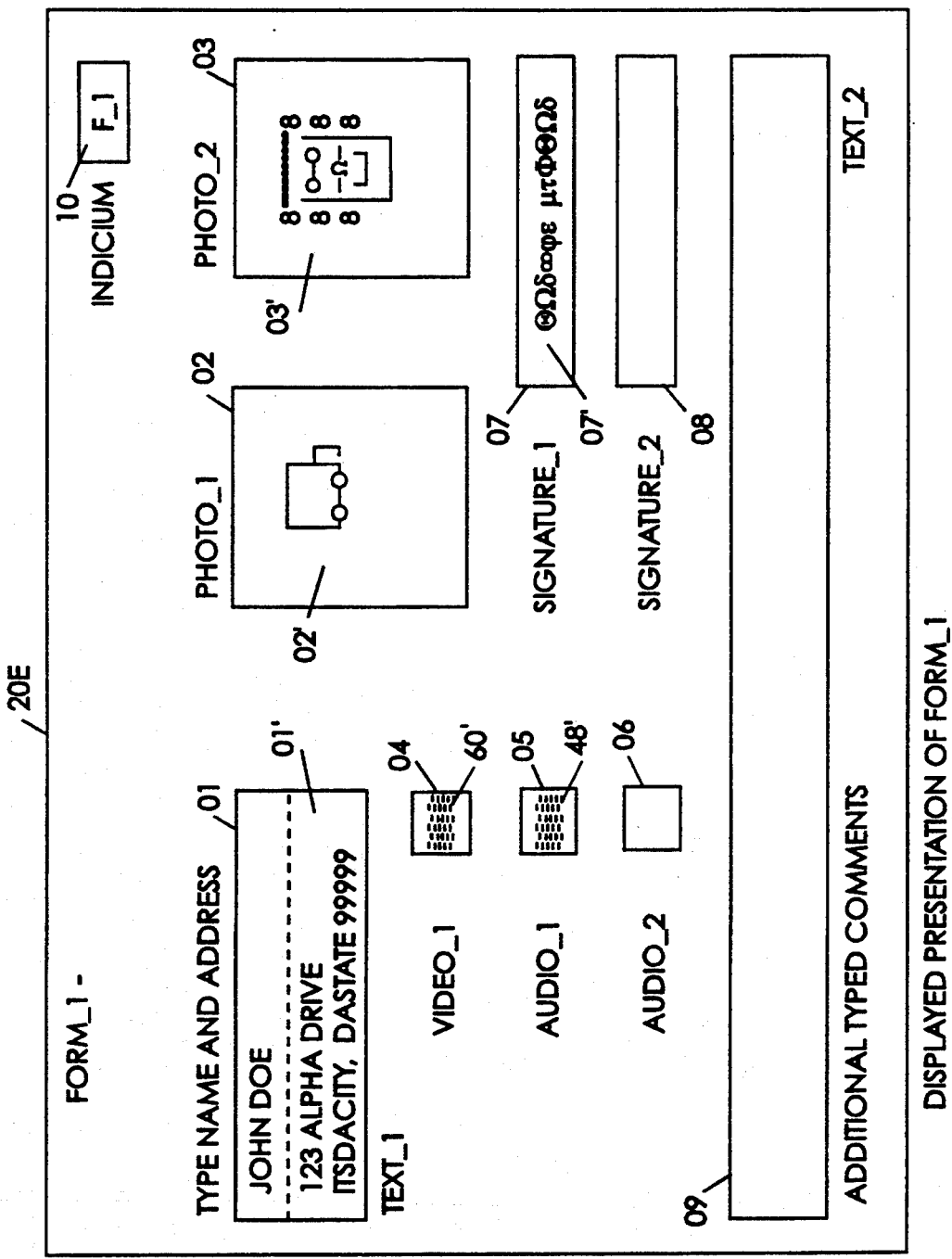
FIG. 9C illustrates the visual presentation of the edited version of the multimedia form which was scanned-in as is shown in FIG. 9A.

Then in accordance with the invention, the check box 04 is highlighted with a highlighting 80' as is shown in FIG. 9C. Step 1060 of FIG. 10 performs similar operations to determine if a text type box has been selected. The video check box 04 is selected by the operator pointing to it with his mouse 115 in step 1040. If any check box has been selected, then the corresponding steps 1040–1046 are carried out to form the appropriate object and to store the object in the MODCA envelope 40 followed by highlighting the corresponding check box to indicate that the object is now a part of the multimedia record 20E. Reference can be made to form 20E which shows the multimedia form with the video check box 04 highlighted 60' and the audio check box 05 highlighted 48', indicating that two nonvisual presentation objects are associated with the document form 20E shown in FIG. 9C.

The series of FIGS. 11A1–11D1 and 11A2–11D2 illustrate another feature of the invention, the creation of a derivative form image from a filled-out master form image. FIG. 12 is a flow diagram of the sequence of operational steps to carry out the creation of a derivative filled-out form.

The example which has been shown herein is an accident report form to be used for example by a municipal police department. FIG. 9C shows a filled-out form 20E which will be referred to here has the parent form. At approximately the time that the parent master form 20A was created by the system administrator, as shown in FIG. 3A, the system administrator can also prepare derivative master forms. An example derivative master form would be a court evidence form 21A as is shown in FIG. 11A1. It can be seen that the derivative master form 21A has element boxes which are a subset of the element boxes shown in the parent master form 20A of FIG. 3A. For example, the derivative master form 21A in FIG. 11A1 has the text box 01, the two image boxes 02 and 03, and the three check boxes 04, 05 and 06. These boxes are a subset of the boxes shown in the parent master form 20A of FIG. 3A.

After the system administrator has defined the derivative form 21A as shown in FIG. 11A1, a corresponding derivative storage envelope 1140, which can be a MODCA format for example, is stored, as is shown in FIG. 11A2. The derivative NODCA of FIG. 11A2 will include a new directory 1142 and form data 1144, which are part of the MODCA 1140 shown in FIG. 11A2. The directory 1142 is shown in greater detail in Table 6A. It can be seen that the directory 1142 of Table 6A includes nine entries which are placeholders for the nine possible records which would be associated with the derivative form 21A of FIG. 11A1. The 01 text line, the 02 image line, the 03 image line, the 04 check box line, the 05 check box line, the 06 check box line, a first audio record line, a second audio record line, and a video record line are all provided as placeholders in the blank directory 1142 shown in Table 6A.

Reference should now be made to the flow diagram of FIG. 12, which illustrates the sequence of operational steps carried out to fill in a derivative master form 21A such is shown in FIG. 11A1, with those information portions which are present in the parent master filled-out form 20E, as is shown in FIG. 9C.

FIG. 12 starts with step 1202 which accesses the filled-out parent master MODCA 40 which is illustrated in FIG. 9B. FIG. 1204 optionally displays the filled-out master form 20E, which is shown in FIG. 9C. Step 1206 then provides the opportunity to the user to make the selection to create a derivative document image. Step 1208 then prompts the operator to input the derivative document ID. This could be the identifying characteristic, indicium, or ID number for the derivative document 21A shown in FIG. 11A1.

Then step 1210 accesses the derivative master MODCA 1140 which is shown in FIG. 11A2. Then in step 1212, the derivative master image form 21A of FIG. 11A1 can optionally be displayed from IOCA image object 1146. This will be the display of the blank form 21A. Then in step 1214 of FIG. 12, the directory 1142 (Table 6A) is gotten from the MODCA envelope 1140 of FIG. 11A2. Then step 1216 starts a loop which gets the first field ID from the directory 1142 for the derivative form. Reference can be made to the blank directory shown in Table 6A.

Then step 1218 of FIG. 12 starts the loop by determining if there is an object present in the parent master MODCA 40 of FIG. 9B which corresponds to one of the identified possible objects in the derivative directory 1142 shown in Table 6A. For example, the first possible object listed in the directory 1142 is the text object 01. Step 1218 determines whether the corresponding text object 01 in the directory 42C (Table 5) for the filled-out master form in FIG. 9B, has an object present. In this example, the PTOCA text object 50 (TEXT-1) is present in the MODCA envelope 40 of FIG. 9B. This corresponds to the filled-out text 01' which can be seen in the filled-out master form 20E of FIG. 9C. Since the object is present in the parent filled-out master form 20E, step 1218 copies the text object 50 from the MODCA envelope 40 of FIG. 9B to the derivative MODCA envelope 1140 of FIG. 11A2, forming text object 50' in the populated MODCA envelope 1140' of FIG. 11B2. Then, step 1220 of FIG. 12 optionally displays the added object, in this example the text object 01', in the derivative master image form 21B shown in FIG. 11B1.

Step 1222 augments the directory 1142 by adding the object name for the text line 01, as is shown in Table 6B for the directory 1142'. If step 1218 determined that the current object is not a displayable object, then the sequence of steps 1230–1238 are performed in FIG. 12, corresponding to multimedia record processing. These steps will be discussed below. Then step 1250 of FIG. 12 determines whether there is still another field ID in the directory 1142 for the derivative form. If there is, then the loop goes back to step 1216. If there is not, then the flow diagram of FIG. 12 proceeds to step 1260 which returns to the main program.

Referring to FIG. 11C1, it can be seen that the loop from step 1216 through step 1250 of FIG. 12 will loop through the first three objects identified in the directory 1142 which are the text object 01, the image object 02 and the image object 03. In FIG. 11C2, it can be seen that the MODCA envelope 1140'' for the derivative form 21C shown in FIG. 11C1, is populated with the text object 50', which was copied over from the text object 50 in FIG. 9B, and the two image objects 52' and 57' which were respectively copied over from the image objects 52 and 57 in FIG. 9B. The corresponding status of the directory 1142 to reflect the population of the text object 01, and the two image objects 02 and 03 in FIG. 11C2, is shown for the directory 1142'' shown in Table 6C.

At the fourth cycle of the loop from step 1216 to step 1250 in the flow diagram of FIG. 12, the first multimedia check box 04 is encountered. Referring to FIG. 11D1, it can be seen that the object 04 is a check box and in particular is the audio check box. In accordance with the invention, step 1230 determines from the directory 42C (Table 5) if the check box 04 is marked and if it is marked, then the step accesses the pointer ("VIDEO-1") from the directory 42C in Table 5 corresponding to the check box 04 in FIG. 9C. The pointer value is then used in step 1232 to copy the multimedia object, in this example the video object 58 in FIG. 9B, to the derivative master MODCA envelope 1140 shown in FIG. 11D2. It can be seen that the video object 58 is copied over as the video object 58' in the derivative master MODCA 1140 of FIG. 11D2.

Then step 1234 of FIG. 12 copies the pointer "VIDEO-1" from the check box line 04 from Table 5 for the parent master filled-out form 20E to the line 04 in the derivative directory 1142 as is shown in FIG. 11D3. Then step 1136 of FIG. 12 copies the object name "VIDEO-1" and the media address "MODCA-VOCA" from the video data line for the video object from the directory in Table 5 to the corresponding video data line of the directory 1142 in Table 6D. This copies the media address for the VDOCA object which is now the media address in the derivative MODCA envelope 1140''. This step also copies the object name, which in this case is "VIDEO-1" and places into the video object line of the directory 1142''' of Table 6D.

Then step 1238 of FIG. 12, optionally plays the multimedia object. In this case the video object can be accessed from either the parent MODCA envelope 40 or the derivative MODCA envelope 1140 and output to the multimedia player over the video adapter 114 in FIG. 1. Then the flow diagram of FIG. 12 proceeds to step 1250 which determines if there is a next field ID in the derivative directory 1140. If there is a derivative directory entry for a next ID, then the flow diagram of FIG. 12 loops back to step 1216. Alternately, if there are no more object IDs in the derivative directory 1142, then the flow diagram of FIG. 12 proceeds to step 1260 which returns to the main program.

Thus it is seen that in accordance with the invention, a variety of derivative filled-out forms can be generated from one master filled-out form, in an automatic fashion. Other types of forms which could be derived from the example traffic accident reporting form of FIG. 2A, could be an alternate reporting form to the insurance company which is related to the accident event.

Although specific embodiment of the invention has been disclosed, it will be understood by those having skill in the art that changes can be made to that specific embodiment without departing from the spirit and the scope of that invention.

TABLE 1

DIRECTORY 42

| OBJECT TYPE | OBJECT SUB-TYPE | FIELD COORD'S. (X1,Y1) (X2,Y2) | MEDIA ADDRESS | OBJECT NAME | POINTER TO OBJ. |
|---|---|---|---|---|---|
| CHKBX | AUDIO | (X1,Y1) (X2,Y2) | | | AUDIO_1 |
| CHKBX | VIDEO | (X1,Y1) (X2,Y2) | | | VIDEO_1 |
| CHKBX | IMAGE | (X1,Y1) (X2,Y2) | | | IMAGE_1 |
| CHKBX | TEXT | (X1,Y1) (X2,Y2) | | | TEXT_1 |
| CHKBX | OTHER | (X1,Y1) (X2,Y2) | | | OTHER_1 |
| AUDIO | DATA | | AUDIO TAPE | AUDIO_1 | |
| VIDEO | DATA | | VIDEO TAPE | VIDEO_1 | |
| IMAGE | DATA | (X1,Y1) (X2,Y2) | | IMAGE_2 | |
| TEXT | DATA | (X1,Y1) (X2,Y2) | | TEXT_2 | |
| OTHER | DATA | | OTHER MEDIUM | OTHER_1 | |
| IMAGE | DATA | | IMAGE ARCHIVE | IMAGE_1 | |
| TEXT | DATA | | ANOTHER FILE | TEXT_1 | |

TABLE 2

DIRECTORY FOR SCANNED-IN MASTER FORM (ALL POSSIBLE BLANKS FILLED)
DIRECTORY: FORM NAME = FORM_1

| | OBJECT TYPE | OBJECT SUB-TYPE | FIELD COORD'S. (X1,Y1) (X2,Y2) | MEDIA ADDRESS | OBJECT NAME | POINTER TO OBJ. |
|---|---|---|---|---|---|---|
| 01 | TEXT | DATA | (3,8) (30,24) | | TEXT_1 | |
| 02 | IMAGE | DATA | (42,8) (56,17) | | IMAGE_1 | |
| 03 | IMAGE | DATA | (63,8) (77,17) | | IMAGE_2 | |
| 04 | CHKBX | VIDEO | (26,15) (30,17) | | | VIDEO_1 |
| 05 | CHKBX | AUDIO | (26,19) (30,21) | | | AUDIO_1 |
| 06 | CHKBX | AUDIO | (26,23) (30,25) | | | AUDIO_2 |
| 07 | IMAGE | DATA | (56,19) (77,21) | | IMAGE_3 | |
| 08 | IMAGE | DATA | (56,23) (77,25) | | IMAGE_4 | |
| 09 | TEXT | DATA | (3,27) (77,31) | | TEXT_2 | |
| | AUDIO | DATA | | AUDIO TAPE | AUDIO_1 | |
| | AUDIO | DATA | | AUDIO TAPE | AUDIO_2 | |
| | VIDEO | DATA | | VIDEO TAPE | VIDEO_1 | |

TABLE 3

DIRECTORY FOR SCANNED-IN MASTER FORM (NO BLANKS FILLED)
DIRECTORY: FORM NAME = FORM_1

| | OBJECT TYPE | OBJECT SUB-TYPE | FIELD COORD'S. (X1,Y1) (X2,Y2) | MEDIA ADDRESS | OBJECT NAME | POINTER TO OBJ. |
|---|---|---|---|---|---|---|
| 01 | TEXT | DATA | (3,8) (30,13) | | | |
| 02 | IMAGE | DATA | (42,8) (56,17) | | | |
| 03 | IMAGE | DATA | (63,8) (77,17) | | | |
| 04 | CHKBX | VIDEO | (26,15) (30,17) | | | |
| 05 | CHKBX | AUDIO | (26,19) (30,21) | | | |
| 06 | CHKBX | AUDIO | (26,23) (30,25) | | | |
| 07 | IMAGE | DATA | (56,19) (77,21) | | | |
| 08 | IMAGE | DATA | (56,23) (77,25) | | | |
| 09 | TEXT | DATA | (3,27) (77,31) | | | |
| | AUDIO | DATA | | | | |
| | AUDIO | DATA | | | | |
| | VIDEO | DATA | | | | |

TABLE 4

DIRECTORY FOR SCANNED-IN MASTER FORM (SOME BLANKS FILLED)
DIRECTORY: FORM NAME = FORM_1

| | OBJECT TYPE | OBJECT SUB-TYPE | IMAGE COORD'S. (X1,Y1) (X2,Y2) | MEDIA ADDRESS | OBJECT NAME | POINTER TO OBJ. |
|---|---|---|---|---|---|---|
| 01 | TEXT | DATA | (3,8) (30,13) | | TEXT_1 | |
| 02 | IMAGE | DATA | (42,8) (56,17) | | IMAGE_1 | |
| 03 | IMAGE | DATA | (63,8) (77,17) | | | |
| 04 | CHKBX | VIDEO | (26,15) (30,17) | | | |
| 05 | CHKBX | AUDIO | (26,19) (30,21) | | | AUDIO_1 |
| 06 | CHKBX | AUDIO | (26,23) (30,25) | | | |
| 07 | IMAGE | DATA | (56,19) (77,21) | | IMAGE_2 | |
| 08 | IMAGE | DATA | (56,23) (77,25) | | | |
| 09 | TEXT | DATA | (3,27) (77,31) | | | |
| | AUDIO | DATA | | MODCA-VOCA | AUDIO_1 | |
| | AUDIO | DATA | | | | |
| | VIDEO | DATA | | | | |

TABLE 5

DIRECTORY FOR SCANNED-IN MASTER FORM (ADDITIONAL BLANKS FILLED)
DIRECTORY: FORM NAME = FORM_1

|    | OBJECT TYPE | OBJECT SUB-TYPE | IMAGE COORD'S. (X1,Y1) (X2,Y2) | MEDIA ADDRESS | OBJECT NAME | POINTER TO OBJ. |
|----|-------------|-----------------|-------------------------------|---------------|-------------|-----------------|
| 01 | TEXT  | DATA  | (3,8) (30,13)   |             | TEXT_1  |         |
| 02 | IMAGE | DATA  | (42,8) (56,17)  |             | IMAGE_1 |         |
| 03 | IMAGE | DATA  | (63,8) (77,17)  |             | IMAGE_3 |         |
| 04 | CHKBX | VIDEO | (26,15) (30,17) |             |         | VIDEO_1 |
| 05 | CHKBX | AUDIO | (26,19) (30,21) |             |         | AUDIO_1 |
| 06 | CHKBX | AUDIO | (26,23) (30,25) |             |         |         |
| 07 | IMAGE | DATA  | (56,19) (77,21) |             | IMAGE_2 |         |
| 08 | IMAGE | DATA  | (56,23) (77,25) |             |         |         |
| 09 | TEXT  | DATA  | (3,27) (77,31)  |             |         |         |
|    | AUDIO | DATA  |                 | MODCA-VOCA  | AUDIO_1 |         |
|    | AUDIO | DATA  |                 |             |         |         |
|    | VIDEO | DATA  |                 | MODCA-VDOCA | VIDEO_1 |         |

TABLE 6A

FIG. 11A3
DIRECTORY FOR DERIVATIVE FORM
DIRECTORY: FORM NAME = DERIVATIVE

|    | OBJECT TYPE | OBJECT SUB-TYPE | IMAGE COORD'S. (X1,Y1) (X2,Y2) | MEDIA ADDRESS | OBJECT NAME | POINTER TO OBJ. |
|----|-------------|-----------------|-------------------------------|---------------|-------------|-----------------|
| 01 | TEXT  | DATA  | (3,8) (30,13)   | | | |
| 02 | IMAGE | DATA  | (42,8) (56,17)  | | | |
| 03 | IMAGE | DATA  | (63,8) (77,17)  | | | |
| 04 | CHKBX | VIDEO | (26,15) (30,17) | | | |
| 05 | CHKBX | AUDIO | (26,19) (30,21) | | | |
| 06 | CHKBX | AUDIO | (26,23) (30,25) | | | |
|    | AUDIO | DATA  | | | | |
|    | AUDIO | DATA  | | | | |
|    | VIDEO | DATA  | | | | |

TABLE 6B

FIG. 11B3
DIRECTORY FOR DERIVATIVE FORM
DIRECTORY: FORM NAME = DERIVATIVE

|    | OBJECT TYPE | OBJECT SUB-TYPE | IMAGE COORD'S. (X1,Y1) (X2,Y2) | MEDIA ADDRESS | OBJECT NAME | POINTER TO OBJ. |
|----|-------------|-----------------|-------------------------------|---------------|-------------|-----------------|
| 01 | TEXT  | DATA  | (3,8) (30,13)   | | TEXT_1 | |
| 02 | IMAGE | DATA  | (42,8) (56,17)  | |        | |
| 03 | IMAGE | DATA  | (63,8) (77,17)  | |        | |
| 04 | CHKBX | VIDEO | (26,15) (30,17) | |        | |
| 05 | CHKBX | AUDIO | (26,19) (30,21) | |        | |
| 06 | CHKBX | AUDIO | (26,23) (30,25) | |        | |
|    | AUDIO | DATA  | | | | |
|    | AUDIO | DATA  | | | | |
|    | VIDEO | DATA  | | | | |

TABLE 6C

FIG. 11C3
DIRECTORY FOR DERIVATIVE FORM
DIRECTORY: FORM NAME = DERIVATIVE

|    | OBJECT TYPE | OBJECT SUB-TYPE | IMAGE COORD'S. (X1,Y1) (X2,Y2) | MEDIA ADDRESS | OBJECT NAME | POINTER TO OBJ. |
|----|-------------|-----------------|-------------------------------|---------------|-------------|-----------------|
| 01 | TEXT  | DATA  | (3,8) (30,13)   | | TEXT_1  | |
| 02 | IMAGE | DATA  | (42,8) (56,17)  | | IMAGE_1 | |
| 03 | IMAGE | DATA  | (63,8) (77,17)  | | IMAGE_3 | |
| 04 | CHKBX | VIDEO | (26,15) (30,17) | |         | |
| 05 | CHKBX | AUDIO | (26,19) (30,21) | |         | |
| 06 | CHKBX | AUDIO | (26,23) (30,25) | |         | |
|    | AUDIO | DATA  | | | | |
|    | AUDIO | DATA  | | | | |
|    | VIDEO | DATA  | | | | |

TABLE 6D

FIG. 11D3
DIRECTORY FOR DERIVATIVE FORM
DIRECTORY: FORM NAME = DERIVATIVE

| OBJECT TYPE | OBJECT SUB-TYPE | IMAGE COORD'S. (X1,Y1) (X2,Y2) | MEDIA ADDRESS | OBJECT NAME | POINTER TO OBJ. |
|---|---|---|---|---|---|
| 01 TEXT | DATA | (3,8) (30,13) | | TEXT_1 | |
| 02 IMAGE | DATA | (42,8) (56,17) | | IMAGE_1 | |
| 03 IMAGE | DATA | (63,8) (77,17) | | IMAGE_3 | |
| 04 CHKBX | VIDEO | (26,15) (30,17) | | | VIDEO_1 |
| 05 CHKBX | AUDIO | (26,19) (30,21) | | | |
| 06 CHKBX | AUDIO | (26,23) (30,25) | | | |
| AUDIO | DATA | | | | |
| AUDIO | DATA | | | | |
| VIDEO | DATA | | MODCA-VDOCA | VIDEO_1 | |

What is claimed is:

1. In a data processing system, a method for defining, manipulating and modifying multiple multimedia document forms, comprising the steps of:

defining an image of a master form in the system, including an identifying characteristic of the form, an image of a data box which contains a displayable record and an image of check box to represent the presence of a multimedia record;

forming a storage envelope in the system for defining the multimedia document form;

storing an image object of the master form in the storage envelope in the system;

defining in said system, a check box object type designation for said check box image;

computing form location coordinates for said data box and check box in said system;

forming a directory in the system for defining the contents of the multimedia document form;

storing said object type designation and said coordinates for said check box in the directory in the system;

storing said directory in said storage envelope in the system;

storing said envelope in said system, accessible by said identifying characteristics of the form;

scanning into said system, a marked-up copy of the master form, creating a marked-up image;

reading in said system, said identifying characteristic on the market-up image;

accessing said storage envelope for the master form in said system, using said identifying characteristic;

accessing said directory from the storage envelope;

getting said coordinates for said check box and said data box from said directory;

determining in said system, if said check box image is marked on the marked-up image;

prompting an operator to input to said system a media address for a multimedia object;

entering the media address into said directory;

adding a pointer in said directory associating the check box to said media address of said multimedia object; and storing a new object at the media address in said system.

2. The method of claim 1 which further comprises presenting an image of said marked-up image, comprising the steps of:

accessing said storage envelope;
getting said image object for said master form;
painting said master image form on a display device;
getting said directory from said storage envelope;
accessing said coordinates for said check box from said directory;
displaying highlighting for said check box on said display device;
prompting the operator to select said displayed check box;
accessing said multimedia object pointed to by said directory entry corresponding to said check box;
playing said accessed multimedia object.

3. The method of claim 2 wherein said accessed object is an audio object.

4. The method of claim 2 wherein said accessed object is a video object.

5. The method of claim 2 which further comprises a method for editing said image of said marked-up image comprising the steps of:

presenting said marked-up image on a display device;
selecting an editing mode and selecting a box on said displayed marked-up image;
accessing said directory from said storage envelope to determine an object type for said selected box;
determining if said object type is an image type and if it is, prompting the operator to scan in a new image;
forming a new image object and storing it in said storage envelope;
displaying of said new image in said selected box on said display device;
determining if said selected box is a check box, and if it is, then prompting the operator to input an object;
storing said corresponding object in said storage envelope;
highlighting said check box;
determining if said selected box is a text type box and if it is, prompting the operator to enter a new text;
forming a text object and storing it in said storage envelope.

6. The method of claim 5 wherein said check box represents an audio object;

7. The method of claim 5 wherein said check box represents a video object.

8. The method of claim 1, which further comprises generating a derivative document form, comprising the steps of:

defining a derivative form image in the system, including a second check box image to represent the presence of said multimedia record;
storing an image object of the derivative form in a second storage envelope in the system;
defining in said system said second check box image;
storing said definition for said second check box in a second directory in the system;

storing said second directory in said second storage envelope in the system;

storing said second envelope in said system;

determining that said first said directory indicates that said first said check box is marked on said marked-up image;

updating said second directory to include in said definition, a reference to said multimedia object.

9. The method of claim 8 which further comprises presenting an image of said derivative form, comprising the steps of:

accessing said second storage envelope;

getting said image object for said derivative form;

painting said image of said derivative form on a display device;

getting said second directory from said second storage envelope;

accessing said definition for said check box from said second directory;

displaying highlighting for said second check box on said display device;

prompting the operator to select said displayed second check box;

accessing said multimedia object referenced by said second directory;

playing said accessed multimedia object.

10. The method of claim 9 wherein said accessed object is an audio object.

11. The method of claim 9 wherein said accessed object is a video object.

12. In a data processing system, a method for defining, manipulating and modifying multiple multimedia document forms, comprising the steps of:

defining an image of a master form in the system, including an identifying characteristics of the form, an image of a check box to represent the presence of a multimedia record and a data box image to contain a displayable record;

forming a storage envelope in the system for defining the multimedia document form;

storing an image object of the master form in the storage envelope in the system;

defining in said system, a check box object type designation for said check box image and a data box object type for said data box image;

computing form location coordinates for said check box and said data box in said system;

forming a directory in the system for defining the contents of the multimedia document form;

storing said object type designations and said coordinates for said check box and said data box in the directory in the system; and storing said directory in said storage envelope in the system; storing said envelope in said system, accessible by said identifying characteristics of the form.

13. The method of claim 12 which further comprises a method for inputting a marked-up image of the master form, comprising the steps of:

scanning into said system, in a marked-up copy of the master form, creating a marked-up image;

reading in said system, said identifying characteristic on the marked-up image;

accessing said storage envelope for the master form in said system, using said identifying characteristic;

accessing said directory from the storage envelope;

getting said coordinates for said check box and said data box from said directory;

determining in said system, if said check box image is marked on the marked-up image;

determining in said system, if a filled box is a text type object, then performing character recognition on the text and storing a text object in the storage envelope and modifying the directory to indicate the presence of the text object;

determining if a box is an image box on the marked-up form;

extracting the image from the image box and forming an image object which is stored in the storage envelope and modifying the directory to indicate the presence of the image object;

prompting the operator to input a media address for a multimedia object;

entering the media address into said directory; and adding a pointer in said directory associating the check box to said media address of said multimedia object;

storing a new object at the media address.

14. The method of claim 13 which comprises a method for presenting an image of said marked-up form comprising the steps of:

accessing said storage envelope;

getting said image object for said master form;

painting said master image form on a display device;

getting said directory from said storage envelope;

accessing said coordinates for said check box from said directory;

displaying highlighting for said check box on said display device;

prompting the operator to select said displayed check box;

accessing said multimedia object pointed to by said directory entry corresponding to said check box;

playing said accessed multimedia object.

15. The method of claim 14 wherein said accessed object is an audio object.

16. The method of claim 14 wherein said accessed object is a video object.

17. The method of claim 14 which further comprises a method for editing said image of said marked-up form comprising the steps of:

presenting said marked-up form on a display device;

selecting an editing mode and selecting a box on said displayed marked-up form;

accessing said directory from said storage envelope to determine an object type for said selected box;

determining if said object type is an image type and if it is, prompting the operator to scan in a new image;

forming a new image object and storing it in said storage envelope;

displaying said image of said new image in said selected box on said display device;

determining if said selected box is a check box, and if it is, then prompting the operator to input an object;

storing said corresponding object in said storage envelope;

highlighting said check box;

determining if said selected box is a text type box and if it is, prompting the operator to enter a new text;

forming a text object and storing it in said storage envelope.

18. The method of claim 17 wherein said check box represents an audio object.

19. The method of claim 17 wherein said check box represents a video object.

20. A data processing system for defining, manipulating and modifying multiple multimedia document form, comprising:

means for defining an image of a master form in the system, including an identifying characteristic of the form, an image of a data box which contains a displayable record and an image of a check box to represent the presence of a multimedia record;

forming a storage envelope in the system for defining the multimedia document form;

means for storing an image object of the master form in the storage envelope in the system;

means for defining a check box object type designation for said check box image;

means for computing form location coordinates for said check box;

forming a directory in the system for defining the contents of the multimedia document form;

means for storing said object type designation and said coordinates for said check box in the directory in the system;

means for storing said directory in said storage envelope in the system;

means for storing said envelope in said system, accessible by said identifying characteristics;

means for scanning in a marked-up copy of the master form, creating a marked-up image;

means for reading said identifying characteristic on the marked-up image;

means for accessing said storage envelope for the master form, using said identifying characteristic of the form;

means for accessing said directory from the storage envelope;

means for getting said coordinates for said check box and said data box from said directory;

means for determining if said check box image is marked on the marked-up image;

means for prompting the operator to input a media address for a multimedia object;

means for entering the media address into said directory; and means for adding a pointer in said directory associating the check box to said media address of said multimedia object; and means for storing the new object at the media address.

21. The system of claim 20, for presenting an image of said marked-up image, comprising:

means for accessing said storage envelope;

means for getting said image object for said master form;

means for painting said master image form on a display device;

means for getting said directory from said storage envelope;

means for accessing said coordinates for said check box from said directory;

means for displaying highlighting for said check box on said display device;

means for prompting the operator to select said displayed check box;

means for accessing said multimedia object pointed to by said directory entry corresponding to said check box; and means for playing said accessed multimedia object.

22. The method of claim 21 wherein said accessed object is an audio object.

23. The method of claim 21 wherein said accessed object is a video object.

* * * * *